US012630701B2

(12) United States Patent
Yang et al.

(10) Patent No.: US 12,630,701 B2
(45) Date of Patent: May 19, 2026

(54) POLYTETRAFLUOROETHYLENE COMPOSITION, FORMING PRODUCT, CONDUCTIVE PIPE, HEAT CONDUCTION FILM, AND SUBSTRATE CCL

(71) Applicants: DAIKIN FLUOROCHEMICALS (CHINA) CO., LTD., Jiangsu (CN); DAIKIN INDUSTRIES, LTD., Osaka (JP)

(72) Inventors: Haijun Yang, Jiangsu (CN); Zhengmao Quan, Jiangsu (CN); Shuji Tagashira, Jiangsu (CN); Katsusada Tokuhira, Osaka (JP); Taku Yamanaka, Osaka (JP)

(73) Assignees: DAIKIN FLUOROCHEMICALS (CHINA) CO., LTD., Jiangsu (CN); DAIKIN INDUSTRIES, LTD., Osaka (JP)

( * ) Notice: Subject to any disclaimer, the term of this patent is extended or adjusted under 35 U.S.C. 154(b) by 1112 days.

(21) Appl. No.: 17/337,802

(22) Filed: Jun. 3, 2021

(65) Prior Publication Data

US 2021/0332228 A1 Oct. 28, 2021

Related U.S. Application Data

(63) Continuation of application No. PCT/CN2019/122956, filed on Dec. 4, 2019.

(30) Foreign Application Priority Data

Dec. 4, 2018 (CN) ........................ 201811474982.2
May 31, 2019 (CN) ........................ 201910472616.1

(51) Int. Cl.
*C08L 27/18* (2006.01)
*B29B 7/00* (2006.01)
(Continued)

(52) U.S. Cl.
CPC .............. *C08L 27/18* (2013.01); *B29B 7/002* (2013.01); *B29B 7/286* (2013.01);
(Continued)

(58) Field of Classification Search
CPC ............................ B29B 7/286; B29K 2027/18
See application file for complete search history.

(56) References Cited

U.S. PATENT DOCUMENTS 9,759,483 B1 * 9/2017 Bero .................... F26B 3/0926
2004/0011903 A1 1/2004 Sawada et al.
(Continued)

FOREIGN PATENT DOCUMENTS

CN 1431935 A 7/2003
CN 101986405 A 3/2011
(Continued)

OTHER PUBLICATIONS

Espacenet translation of JP 2015151543 A (Year: 2024).*
(Continued)

*Primary Examiner* — Michael M Dollinger
(74) *Attorney, Agent, or Firm* — Sughrue Mion, PLLC

(57) ABSTRACT

A method for producing a polytetrafluoroethylene composition including mixing a polytetrafluoroethylene resin and a filler using an airflow mixer to provide a polytetrafluoroethylene composition containing the polytetrafluoroethylene resin and the filler. The airflow mixer is a pulse-type airflow mixer or an airflow stirrer. Also disclosed is a polytetrafluoroethylene composition produced by the production method, a polytetrafluoroethylene composition having specific physical properties, as well as a molded article, electrically conductive tube, thermally conductive film, and substrate for CCL each obtained from the polytetrafluoroethylene composition.

18 Claims, 15 Drawing Sheets

(51) Int. Cl.

| | |
|---|---|
| ***B29B 7/28*** | (2006.01) |
| *B29K 27/18* | (2006.01) |
| *C08K 3/013* | (2018.01) |

(52) U.S. Cl.

CPC .......... *B29K 2027/18* (2013.01); *C08K 3/013* (2018.01); *C08K 2201/005* (2013.01); *C08L 2203/20* (2013.01)

(56) References Cited

U.S. PATENT DOCUMENTS

2012/0140588 A1* 6/2012 Pfeffer .................. B01F 33/407 977/775
2017/0321034 A1 11/2017 Iwata et al.

FOREIGN PATENT DOCUMENTS

| | | | | |
|---|---|---|---|---|
| CN | 102766310 A | | 11/2012 | |
| CN | 102807793 A | | 12/2012 | |
| CN | 105879763 A | | 8/2016 | |
| CN | 106499610 A | | 3/2017 | |
| CN | 108790327 A | | 11/2018 | |
| CN | 108895767 A | * | 11/2018 | ............ F26B 21/002 |
| JP | 62-100539 A | | 5/1987 | |
| JP | 3-212987 A | | 9/1991 | |
| JP | 4-345836 A | | 12/1992 | |
| JP | 2015-151543 A | | 8/2015 | |
| JP | 2016-113617 A | | 6/2016 | |
| JP | 2018-109149 A | | 7/2018 | |
| WO | 2017/135168 A1 | | 8/2017 | |

OTHER PUBLICATIONS

FIT Translation of CN_108790327_A_I (Year: 2024).*

Akhavan et al (Powder Technology 284 (2015) 521â529) (Year: 2015).*

Ali et al (Advanced Powder Technology 25 (2014) 331â337) (Year: 2014).*

Hadi et al (|Ind. Eng. Chem. Res. 2012, 51, 1713â1720) (Year: 2012).*

Raganati et al (Chemical Engineering Research and Design, 133 (2018) 347-387) (Year: 2018).*

Extended European Search Report dated Jul. 25, 2022 in Application No. 19894027.2.

Sakamon Devahastin et al., “Some hydrodynamic and mixing characteristics of a pulsed spouted bed dryer”, Powder Technology, May 9, 2001, vol. 117, No. 3, pp. 189-197 (9 pages total).

International Preliminary Report on Patentability dated Jun. 8, 2021 from the from the International Searching Search Authority in International Application No. PCT/CN2019/122956.

Translation of Written Opinion dated Mar. 9, 2020 from the International Searching Search Authority in International Application No. PCT/CN2019/122956.

International Search Report of PCT/CN2019/122956 dated Mar. 9, 2020 [PCT/ISA/210].

* cited by examiner

POLYTETRAFLUOROETHYLENE COMPOSITION, FORMING PRODUCT, CONDUCTIVE PIPE, HEAT CONDUCTION FILM, AND SUBSTRATE CCL

CROSS-REFERENCE TO RELATED APPLICATIONS

This application is a Rule 53(b) Continuation of International Application No. PCT/CN2019/122956 filed Dec. 4, 2019, which claims priority based on Chinese Patent Application Nos. 201811474982.2 filed Dec. 4, 2018 and 201910472616.1 filed May 31, 2019, the respective disclosures of which are incorporated herein by reference in their entirety.

TECHNICAL FIELD

The invention relates to a method for producing a polytetrafluoroethylene composition, a polytetrafluoroethylene composition obtainable by the production method, and a polytetrafluoroethylene composition having specific physical properties, as well as a molded article, electrically conductive tube, thermally conductive film, and substrate for CCL each obtainable with the polytetrafluoroethylene composition.

BACKGROUND ART

Polytetrafluoroethylene (PTFE) has properties such as excellent high- and low-temperature resistance, corrosion resistance, aging resistance, high insulation, and low viscosity, and thus is used for a wide variety of applications. Polytetrafluoroethylene itself has poor size stability, poor thermal conductivity, low hardness, and easiness of wear, and thus has limitations for applications in the fields of mechanical loading, friction and wear, and sealing and lubrication.

In order to widen the range of applications of polytetrafluoroethylene, proposals have been made in which polytetrafluoroethylene is mixed with other filler to improve the performance. Conventionally known techniques for mixing polytetrafluoroethylene with filler include dry mixing and wet mixing. In the case of dry mixing (e.g., mechanical stirring), PTFE dispersion resin is sensitive to shearing and easily becomes fibers, while filler is easy to coagulate. This causes a failure in uniformly mixing polytetrafluoroethylene with filler, resulting in incomplete covering on PTFE particles (see FIG. 1 with regard to particles after combined). In the case of wet mixing, a solvent is used. This means the process is environmentally unfriendly and is complicated (see FIG. 2 with regard to particles after combined).

Patent Literature 1 discloses a method for dry-blending modified polytetrafluoroethylene having an extrusion pressure of lower than 25 MPa at a RR of 1600 with filler using, for example, a mechanical stirrer provided with impellers.

Patent Literature 2 discloses a method for providing a uniform powder mixture by wet-mixing polytetrafluoroethylene and filler, including coagulating emulsion-polymerized polytetrafluoroethylene particles in an aqueous dispersion thereof to provide coagulated polytetrafluoroethylene powder in which the emulsion-polymerized particles are coagulated, mixing the coagulated powder with filler and dry ice, and adding isopropyl alcohol water to the mixture for granulation.

CITATION LIST

Patent Literature 1: JP 2018-109149 A
Patent Literature 2: JP 2015-151543 A

SUMMARY

The method for producing a polytetrafluoroethylene composition of the invention includes mixing a polytetrafluoroethylene resin and a filler using an airflow mixer to provide a polytetrafluoroethylene composition containing the polytetrafluoroethylene resin and the filler.

BRIEF DESCRIPTION OF THE DRAWINGS

FIG. 4A is a photograph at a magnification of 200×; FIG. 4B is a photograph at a magnification of 350×.

FIG. 7A is a photograph at a magnification of 200×; FIG. B is a photograph at a magnification of 350×.

FIG. 13A is a photograph at a magnification of 50×; (FIG. 13B is a photograph at a magnification of 600×.

FIG. 14A is a photograph at a magnification of 50×; FIG. 14B is a photograph at a magnification of 600×.

DESCRIPTION OF EMBODIMENTS

Figure 1:
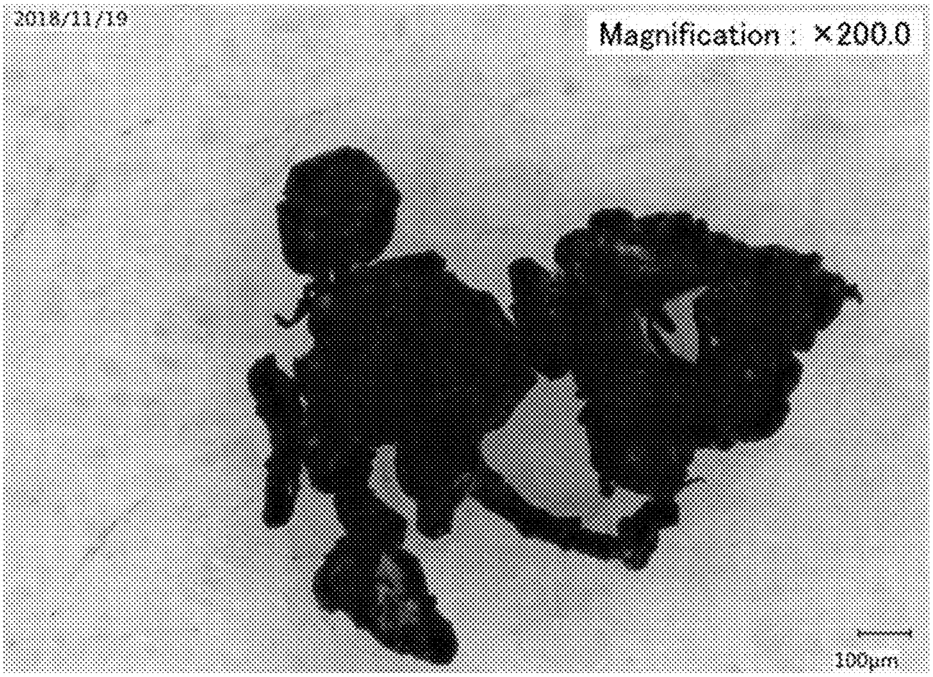
FIG. 1 is an optical micrograph (magnification: 200×) of a PTFE-carbon black composite particle obtained by mechanical mixing in a conventional technique (Comparative Example 1).

In the production method of the invention, a polytetrafluoroethylene (PTFE) resin and a filler are mixed using an airflow mixer to provide a polytetrafluoroethylene composition containing the polytetrafluoroethylene resin and the filler uniformly mixed.

In the production method of the invention, polytetrafluoroethylene resin and a filler are mixed using an airflow mixer. The principle is such that the materials in the mixing chamber are brought to a boil and sufficient mixing thereof is initiated immediately after injection of compressed air from a lower portion of the mixer, while the injected air is discharged through an upper air filter. Neither mechanical transmission nor shearing occurs in the course of mixing with an airflow mixer, which is suitable for dispersed PTFE. Further, the compressed air enables de-coacervation of the materials in the form of coagulum or coacervate. Thereby, the production method of the invention can provide a polytetrafluoroethylene composition in which the polytetrafluoroethylene and the filler are uniformly mixed without coacervation.

In other words, the production method of the invention enables mixing of polytetrafluoroethylene with filler without excessive formation of polytetrafluoroethylene fibers, and thus can provide a polytetrafluoroethylene composition in which the polytetrafluoroethylene and the filler are uniformly mixed.

In the production method of the invention, the filler preferably covers surfaces of particles of the polytetrafluoroethylene resin. In the invention, the airflow mixer is used for mixing. This can prevent excessive formation of fibers of the polytetrafluoroethylene resin, which is sensitive to shearing, and enables more uniform mixing of the polytetrafluoroethylene resin and the filler as well as uniform covering of surfaces of particles of the polytetrafluoroethylene resin with the filler.

The polytetrafluoroethylene (PTFE) resin preferably has fibrillatability. The fibrillatability refers to an ability to easily form fibers and eventually form fibrils.

The presence or absence of fibrillatability can be determined by "paste extrusion", which is a typical method of molding "high molecular weight PTFE powder" that is powder (dispersed resin, i.e., fine powder) formed from an emulsion polymer of tetrafluoroethylene (TFE). The ability of high molecular weight PTFE powder to be processible by paste extrusion is commonly derived from its fibrillatability. In the cases where an unsintered molded article obtained by paste extrusion substantially lacks strength or elongation, for example, where an unsintered molded article has an elongation of 0% and breaks when stretched, the article is regarded as lacking fibrillatability.

The PTFE resin preferably has non-melt secondary processibility. The non-melt secondary processibility means the incapability of resin to measure the melt flow rate at a temperature higher than the crystallization melting point in conformity with ASTM D-1238 and D-2116.

The PTFE resin may be in the form of particles or in the form of powder.

In the production method of the invention, the polytetrafluoroethylene resin used may be either a PTFE dispersion resin or a PTFE suspension resin, and the polytetrafluoroethylene resin is preferably a polytetrafluoroethylene dispersion resin. A polytetrafluoroethylene dispersion resin is more sensitive to shearing and more easily forms fibers. Still, the production method of the invention involves no shearing, which is more suitable for mixing of a polytetrafluoroethylene dispersion resin and a filler.

The PTFE dispersion resin is formed by coagulating and drying the polymer in a dispersion formed by emulsion polymerization. The polytetrafluoroethylene dispersion resin used in the invention may be one prepared by a known method or may be a commercially available polytetrafluoroethylene dispersion resin. Examples of commercially available polytetrafluoroethylene dispersion resins include POLYFLON PTFE F-104, F-208, and F-302 (available from Daikin Industries, Ltd.).

The PTFE dispersion resin may be a PTFE fine powder. The PTFE fine powder is powder (secondary particles) obtainable by emulsion-polymerizing TFE to provide a PTFE aqueous dispersion and then coagulating the PTFE primary particles in the PTFE aqueous dispersion. The PTFE fine powder may be one obtainable by granulating, through a known method, the particles obtained by polymerization.

The PTFE dispersion resin preferably has an average particle size of 250 μm or greater and 800 μm or smaller, more preferably 300 μm or greater and 600 μm or smaller.

The PTFE dispersion resin preferably has a standard specific gravity (SSG) of 2.13 or higher and 2.28 or lower, more preferably 2.14 or higher and 2.20 or lower. The PTFE dispersion resin preferably has an apparent density of 400 g/L or higher and 600 g/L or lower. The PTFE dispersion resin preferably has a reduction ratio (RR) of 20 or higher and 3500 or lower, more preferably 100 or higher and 3500 or lower. The reduction ratio refers to the ratio of the cross-sectional area (S1) of the resin in an extrusion cylinder and the cross-sectional area (S2) of the resin at an orifice.

The PTFE suspension resin preferably has an average particle size of 15 μm or greater and 200 μm or smaller. The PTFE suspension resin preferably has an apparent density of 300 g/L or higher and 600 g/L or lower. The PTFE suspension resin preferably has a standard specific gravity of 2.13 or higher and 2.28 or lower, more preferably 2.14 or higher and 2.20 or lower.

The PTFE suspension resin may be a PTFE molding powder. The PTFE molding powder is a powder obtainable by suspension-polymerizing TFE. The PTFE molding powder may be one obtainable by granulating, through a known method, the particles obtained by polymerization.

The average particle size of the PTFE resin is measured in conformity with JIS K6891. The average particle size may be the average particle size of PTFE secondary particles.

The SSG of the PTFE resin is measured by the water replacement method in conformity with ASTM D-792 using a sample molded in conformity with ASTM D 4895-89.

The apparent density of the PTFE resin is measured in conformity with JIS K6891 (for suspension resin, i.e., molding powder) or JIS K6892 (for dispersed resin, i.e., fine powder).

The PTFE resin preferably has a melting point of 324° C. to 360° C. The melting point means the first melting point. The first melting point is the temperature corresponding to the maximum value on a heat-of-fusion curve obtained by heating, at a rate of 10° C./min using a differential scanning calorimeter (DSC), a PTFE that has never been heated up to 300° C. or higher.

The PTFE resin may be a TFE homopolymer consisting only of tetrafluoroethylene (TFE) or may be a modified PTFE. The modified PTFE contains a TFE unit and a modifying monomer unit based on a modifying monomer copolymerizable with TFE.

The modifying monomer may be any monomer copolymerizable with TFE, and examples thereof include perfluoroolefins such as hexafluoropropylene (HFP); perhaloolefins such as chlorotrifluoroethylene (CTFE); hydrogen-containing fluoroolefins such as trifluoroethylene and vinylidene fluoride (VDF); perfluorovinyl ether; (perfluoroalkyl)ethylene; ethylene; and a fluorine-containing vinyl ether containing a nitryl group. One modifying monomer may be used or a plurality of modifying monomers may be used.

Examples of the perfluorovinyl ether include, but are not limited to, an unsaturated perfluorinated compound represented by the following formula (1):

$$CF_2{=}CF{-}ORf^1 \quad (1)$$

(wherein $Rf^1$ is a perfluoroorganic group). The "perfluoroorganic group" as used herein means an organic group obtainable by replacing every hydrogen atom bonded to any carbon atom by a fluorine atom. The perfluoroorganic group may contain ether oxygen.

Examples of the perfluorovinyl ether include a perfluoro (alkyl vinyl ether) (PAVE) represented by the formula (1) wherein $Rf^1$ is a C1-C10 perfluoroalkyl group. The perfluoroalkyl group preferably has a carbon number of 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. Preferred is perfluoro (propyl vinyl ether) (PPVE) in which the perfluoroalkyl group is a perfluoropropyl group.

Examples of the perfluorovinyl ether also include those represented by the formula (1) wherein $Rf^1$ is a C4-C9 perfluoro(alkoxyalkyl) group, those represented by the formula (1) wherein $Rf^1$ is a group represented by the following formula:

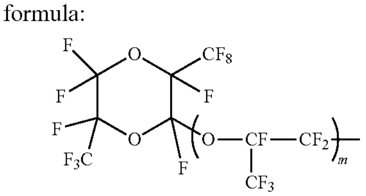

(wherein m is 0 or an integer of 1 to 4), and those represented by the formula (1) wherein $Rf^1$ is a group represented by the following formula:

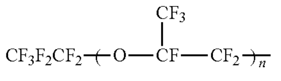

(wherein n is an integer of 1 to 4).

Examples of the perfluoroalkylethylene include, but are not limited to, perfluorobutylethylene (PFBE) and perfluorohexylethylene (PFHE).

The fluorine-containing vinyl ether containing a nitryl group is more preferably a fluorine-containing vinyl ether represented by $CF_2{=}CFORf^2CN$ wherein $Rf^2$ is a C2-C7 alkylene group in which an oxygen atom is optionally present between two carbon atoms.

The modifying monomer in the modified PTFE preferably includes at least one selected from the group consisting of HFP, CTFE, VDF, PPVE, PFBE, and ethylene. The modifying monomer more preferably includes at least one monomer selected from the group consisting of HFP and CTFE.

The polymerized unit based on a modifying monomer (modifying monomer unit) is preferably in an amount within a range of 0.00001 to 1.0% by mass. The lower limit of the modifying monomer unit is more preferably 0.0001% by mass, more preferably 0.0005% by mass, still more preferably 0.001% by mass. The upper limit of the modifying monomer unit is preferably 0.90% by mass, more preferably 0.50% by mass, still more preferably 0.40% by mass, further preferably 0.30% by mass, further more preferably 0.10% by mass, particularly preferably 0.08% by mass, particularly preferably 0.05% by mass, particularly preferably 0.01% by mass.

The modifying monomer unit as used herein means a portion that is part of the molecular structure of PTFE and that is derived from a modifying monomer.

In the description, the amounts of the monomers constituting the PTFE can be calculated by appropriate combination of NMR, FT-IR, elemental analysis, and X-ray fluorescence analysis in accordance with the types of the monomers.

In the production method of the invention, the "filler" is a powdery substance used to improve a variety of physical properties of a molded article, and may be a functional filler or a toner powder. The functional filler may be any of a variety of organic filler and inorganic filler. Examples of the organic filler include aramid fiber, polyphenyl ester (POB), polyphenylene sulfide (PPS), polyimide (PI), polyether ether ketone (PEEK), polyphenylene, polyamide, and wholly aromatic polyester resin. Preferred are polyphenyl ester (POB), polyphenylene sulfide (PPS), polyimide (PI), polyether ether ketone (PEEK), polyphenylene, polyamide, and wholly aromatic polyester resin. Examples of the inorganic filler include metal powder, graphite, carbon black, coke, carbon powder, carbon fiber, graphene, carbon nanotube, ceramic, talc, mica, aluminum oxide, zinc oxide, tin oxide, titanium oxide, silicon oxide, calcium carbonate, calcium oxide, magnesium oxide, potassium titanate, glass fiber, glass pieces, glass beads, silicon carbide, calcium fluoride, boron nitride (BN), barium sulfate, molybdenum disulfide, and potassium carbonate whiskers. Preferred are metal powder, graphite, carbon black, coke, carbon powder, graphene, carbon nanotube, ceramic, talc, mica, aluminum oxide, zinc oxide, tin oxide, titanium oxide, silicon oxide, calcium carbonate, calcium oxide, magnesium oxide, potassium titanate, glass pieces, glass beads, silicon carbide, calcium fluoride, boron nitride (BN), barium sulfate, molybdenum disulfide, and potassium carbonate whiskers. Different types of fillers may be used in combination. Even for the same type of fillers, those having different shapes or sizes may be used in combination.

The filler may include an inorganic filler, may include at least one selected from the group consisting of carbon inorganic filler and ceramic, may include at least one selected from the group consisting of graphite, carbon black, carbon fiber, and ceramic, or may include at least one selected from the group consisting of graphite, carbon black, and ceramic.

The filler may be in the form of particles or may be in the form of fibers, and is preferably in the form of particles.

The filler preferably has a particle size of 10 nm or greater and 100 μm or smaller, more preferably 10 nm or greater and 50 μm or smaller. This enables more uniform mixing.

The particle size of the filler may be the average particle size, and can be measured by any known measuring method, such as imaging, screening, or light scattering, in accordance with the type of the filler.

The average particle size of the filler is preferably smaller than the average particle size of the polytetrafluoroethylene resin particles. This allows the filler to more uniformly cover surfaces of the polytetrafluoroethylene resin particles.

The filler preferably has an aspect ratio of 50 or lower. This allows the filler to more uniformly cover surfaces of the polytetrafluoroethylene resin particles. The aspect ratio is more preferably 30 or lower, still more preferably 20 or lower, particularly preferably 10 or lower.

The aspect ratio is determined by observing the filler using a scanning electron microscope (SEM), imaging any randomly selected 10 or more particles, and averaging the ratios of the major diameter to the miner diameter.

In consideration of factors such as the performance of a final molded article, the filler is preferably added in an amount of 0.1% by weight or more, more preferably 1% by weight or more, while preferably 60% by weight or less, more preferably 20% by weight or less, relative to the total amount of the polytetrafluoroethylene resin and the filler.

The amount is also preferably 0.1% by weight or more and 60% by weight or less, more preferably 1% by weight or more and 60% by weight or less, still more preferably 1% by weight or more and 20% by weight or less, relative to the total amount of the polytetrafluoroethylene resin and the filler.

The amount of the filler may be set as appropriate in accordance with the type of the filler. For graphite, the amount of the filler is preferably 15% by weight or more and 25% by weight or less. For carbon fiber, the amount of the filler is preferably 10% by weight or more and 25% by weight or less. For carbon black, the amount of the filler is preferably 1% by weight or more and 10% by weight or less. For glass fiber, the amount of the filler is preferably 15% by weight or more and 30% by weight or less. For molybdenum disulfide, the amount of the filler is preferably 0.1% by weight or more and 5% by weight or less. For ceramic powder, the amount of the filler is preferably 20% by weight or more and 60% by weight or less. For copper powder, the amount of the filler is preferably 30% by weight or more and 60% by weight or less. For POB, the amount of the filler is preferably 10% by weight or more and 30% by weight or less. For PI, the amount of the filler is preferably 5% by weight or more and 15% by weight or less. For PPS, the amount of the filler is preferably 10% by weight or more and 30% by weight or less. For PEEK, the amount of the filler is preferably 5% by weight or more and 20% by weight or less. For glass beads, the amount of the filler is preferably 10% by weight or more and 30% by weight or less. For BN, the amount of the filler is preferably 5% by weight or more and 15% by weight or less. For stainless steel powder, the amount of the filler is preferably 30% by weight or more and 60% by weight or less. For carbon powder, the amount of the filler is preferably 15% by weight or more and 25% by weight or less.

In a preferred embodiment of the production method of the invention, the PTFE and the filler have a load factor of 0.2 or higher and 0.6 or lower. Too high a load factor may cause an insufficient mixing space and affect the mixing effects. Too low a load factor may cause a low space density of the PTFE and the filler in the mixing chamber, cause a lower probability of contact therebetween, and affect the mixing efficiency. The load factor is the ratio of the actual volume of the materials when the mixer reaches the stirring effect to the whole capacity of the mixing chamber.

In the production method of the invention, the airflow mixer used may be any of a variety of airflow mixers such as a pulse-type airflow mixer, an airflow stirrer, and an airflow pulverizer. The airflow mixer includes no stirring device and thus is suitable for PTFE resin, which is sensitive to shearing, and can reduce coagulation due to, for example, fiber formation. Preferred among these is a pulse-type airflow mixer. In this case, the air can enter the mixing chamber in the form of pulses and disperse the materials, in particular, increase the contact area between the materials. Further, rapid air can cause de-coacervation of the materials in the form of coagulum or coacervate, which contributes to mixing of the materials.

An example of the pulse-type airflow mixer is described with reference to a figure, but the pulse-type airflow mixer to be used in the production method of the invention is not limited thereto.

Figure 15:
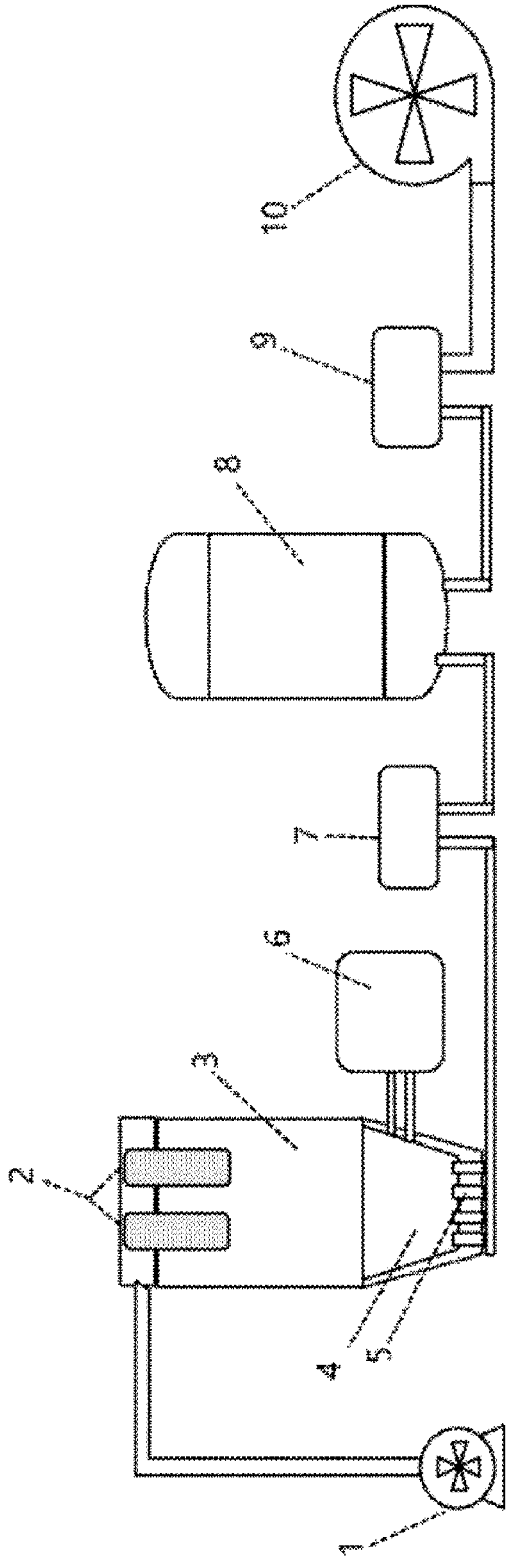
FIG. 15 is a schematic cross-sectional view of an example of a pulse-type airflow mixer.

FIG. 15 is a schematic cross-sectional view of an example of a pulse-type airflow mixer. The pulse-type airflow mixer illustrated in FIG. 15 includes a mixing tank body 3 for airflow mixing provided at a lower portion with a material storage tank 4. The materials such as a PTFE resin and a filler are fed through a material port (not illustrated) of the material storage tank 4.

The air used for airflow mixing is first compressed by an air compressor 10, then cooled and dried by a cooling dryer 9, and stored in a compressed air storage tank 8. The compressed air is fed to the material storage tank 4 through nozzles 5 under a pulse condition controlled by a pulse controller 7. The materials stored in the material storage tank 4 are blown up by the compressed air fed and are mixed in the mixing tank body 3. The temperature inside the mixing tank body 3 can be adjusted by a temperature controller 6.

The mixing tank body 3 is provided at an upper portion with a filter 2 through which the air used for airflow mixing is discharged. The air discharged from the mixing tank body 3 is exhausted to the outside through an exhauster 1.

In the case of using a pulse-type airflow mixer in the mixing, the pulse-type airflow mixer is preferably adjusted to have a pulse interval of 5 seconds or longer and 30 seconds or shorter, more preferably 10 seconds or longer and 30 seconds or shorter, still more preferably 20 seconds or longer and 30 seconds or shorter. Too short a pulse interval may cause emission of the next pulse before complete precipitation of the filler. This may reduce the probability of contact between the filler and the PTFE present at a lower portion, reducing sufficient and uniform mixing effects. Too long a pulse interval may cause prolonged duration of the mixing on the whole, possibly reducing the production efficiency.

In the case of using a pulse-type airflow mixer, the single pulse airflow duration can be specifically set in accordance with the apparent density of the filler. The higher the apparent density is, the longer the duration can be set. In the mixing, the single pulse airflow duration of the pulse-type airflow mixer is preferably set to 0.8 seconds or longer and 2 seconds or shorter, preferably 0.8 seconds or longer and 1.5 seconds or shorter. This is because too short a single pulse airflow duration may reduce the probability of participation of the PTFE present at a lower portion of the mixer in the mixing. Too long a single pulse airflow duration tends to cause filler pieces having a small apparent density to always float, reducing sufficient and uniform mixing effects.

In the case of using a pulse-type airflow mixer, the pulse count can be specifically set in accordance with factors such as the load factor, the type of the filler, the amount of the filler, and the specific surface area of the filler. In the mixing, the pulse-type airflow mixer is preferably set to have a pulse count of 5 or more and 40 or less, more preferably 10 or more and 40 or less, still more preferably 15 or more and 40 or less. Too small a pulse count may reduce sufficient mixing effects. Too large a pulse count tends to cause prolonged mixing cycles and reduced mixing efficiency.

In the mixing in the production method of the invention, the airflow mixer is preferably set to have an intake pressure of 0.4 MPa or higher and 0.8 MPa or lower, more preferably 0.5 MPa or higher and 0.8 MPa or lower, still more preferably 0.6 MPa or higher and 0.8 MPa or lower. An intake pressure of lower than 0.4 MPa may cause a low height of the materials blown by the airflow and an insufficient mixing space, reducing sufficient and uniform mixing effects. An intake pressure of higher than 0.8 MPa may cause the materials to stick to the filter at the top of the mixing chamber, possibly resulting in the absence of such materials in the subsequent mixing.

In the mixing in the production method of the invention, the airflow mixer is preferably controlled to have a temperature within a range of 5° C. or higher and 30° C. or lower, preferably 5° C. or higher and 25° C. or lower, more preferably 5° C. or higher and 19° C. or lower. This can lead to mixing of the materials in a low-temperature environment, reduced formation of fibers of the polytetrafluoroethylene resin, improved fluidity of the particles, and improved mixing efficiency.

In the mixing in the production method of the invention, the temperature of the airflow mixer is preferably controlled by circulation of a coolant or with a freezing air dryer. This can lead to good temperature control to low temperatures and better mixing effects.

In one preferred embodiment, the production method of the invention includes the following steps:

feeding substances to a mixing chamber at an appropriate load factor using a pulse-type airflow mixer;

adjusting parameters such as the intake pressure, the pulse interval, the single pulse airflow duration, and the pulse count;

starting a temperature control system and decreasing the temperature of the mixing chamber down to the temperature for mixing; and starting the mixing.

A polytetrafluoroethylene composition (also referred to as a first PTFE composition) produced by the production method of the invention is advantageous in that the filler uniformly covers surfaces of polytetrafluoroethylene particles, which has no influence on the subsequent processing and can lead to improved production of polytetrafluoroethylene.

In the production method of the invention, no organic solvent is preferably used. In other words, neither the PTFE resin nor the filler is preferably mixed with an organic solvent. The first PTFE composition is preferably substantially free from an organic solvent. This can reduce any failure due to organic solvent residues. Specific examples of the organic solvent will be described later.

In the first PTFE composition, the organic solvent is preferably in an amount of 500 ppb by mass or less, more preferably 100 ppb by mass or less, more preferably less than 100 ppb by mass, still more preferably 10 ppb by mass or less, particularly preferably 1 ppb by mass or less, relative to the PTFE composition. The lower limit may be, but is not limited to, lower than the detection limit.

The amount of the organic solvent can be measured by headspace sampling GC/MS analysis. Specifically, 1 g of a sample is heated at 200° C. for 30 minutes in a headspace and subjected to measurement using Agilent 5977A (column DB-624). The detection limit in this analysis is 100 ppb by mass.

The invention also relates to a polytetrafluoroethylene (PTFE) composition (also referred to as a second PTFE composition) containing particles of a polytetrafluoroethylene resin and a filler covering surfaces of the particles, the polytetrafluoroethylene composition being substantially free from an organic solvent, the polytetrafluoroethylene resin including a fibrillatable polytetrafluoroethylene dispersion resin, the filler having a coverage of 50% or higher and 100% or lower on the surfaces of the particles.

Owing to the fact that the filler has a coverage of 50% or higher and 100% or lower on the surfaces of the particles, the second PTFE composition can provide a molded article that is able to sufficiently exert characteristics derived from the filler. The second PTFE composition can also provide a molded article that suffers less defects such as scratches, tears, cracks, or holes and that has excellent strength and durability.

The coverage is preferably 60% or higher, more preferably 70% or higher, still more preferably 80% or higher, further more preferably 90% or higher, particularly preferably 95% or higher.

The coverage is calculated by the following formula after binarizing a 200× enlarged photograph taken using a video microscope (video microscope VHX-900 available from KEYENCE):

$$\text{Coverage }(\%)=S2/(S1+S2)\times 100$$

wherein S1 represents the area of a region where the PTFE resin is not covered with the filler; and S2 represents the area of a region where the PTFE resin is covered with the filler.

The binarization may be performed with any image analysis software. For example, free software Image J, distributed by the National Institutes of Health (NIH) may be used.

The coverage in the second PTFE composition may also be measured by a technique using a scanning electron microscope (SEM) and elemental mapping.

Certain mixing conditions of the PTFE resin and the filler or certain colors of the filler may make it difficult to calculate the coverage with an optical micrograph. For example, if filler pieces smaller than primary particles (emulsion particles, having a particle size of 1 μm or smaller) of the PTFE resin are dispersed between and mixed with the primary particles of the PTFE resin, the boundaries are indistinguishable on an optical micrograph. In this case, the coverage can be effectively determined by a technique using SEM and elemental mapping.

The coverage based on SEM and elemental mapping can be determined as follows by a method similar to the coverage calculation from a video microscopic image. Specifically, the coverage can be determined by performing elemental mapping for fluorine using SEM (SU8020 scanning electron microscope available from Hitachi Ltd.) for imaging and then binarizing the image.

In the second PTFE composition, the PTFE resin constituting the particles is a fibrillatable PTFE dispersion resin. Thereby, the second PTFE composition has excellent fibrillatability and can provide a uniform paste extrudate. The PTFE dispersion resin used may be similar to the PTFE dispersion resin to be used in the aforementioned production method of the invention.

The PTFE resin preferably has non-melt secondary processibility. The non-melt secondary processibility is as described above.

The particles of the PTFE resin may be secondary particles of the PTFE resin.

The particles of the PTFE resin preferably have an average particle size of 250 μm or greater and 800 μm or smaller, more preferably 300 μm or greater and 600 μm or smaller.

The filler used in the second PTFE composition may be similar to the filler to be used in the aforementioned production method of the invention.

The filler may be in the form of particles or may be in the form of fibers, and is preferably in the form of particles.

The filler preferably has an average particle size of 10 nm or greater and 100 μm or smaller, more preferably 10 nm or greater and 50 μm or smaller.

The average particle size of the filler is preferably smaller than the average particle size of the PTFE resin particles.

The filler preferably has an aspect ratio of 50 or lower, more preferably 30 or lower, still more preferably 20 or lower, particularly preferably 10 or lower.

In the second PTFE composition, the filler is preferably contained in an amount of 0.1% by weight or more, more preferably 1% by weight or more, while preferably 60% by weight or less, more preferably 20% by weight or less, relative to the total amount of the particles of the polytetrafluoroethylene resin and the filler.

The amount of the filler can be set as appropriate in accordance with the type of the filler. Specific ranges of the amount for the respective types of the filler are as described above.

The second PTFE composition is substantially free from an organic solvent. This can reduce occurrence of defects due to organic solvent residues.

Examples of the organic solvent include, but are not limited to, a water-soluble organic solvent, a chlorinated hydrocarbon, and a fluorinated hydrocarbon.

Specific examples of the organic solvent include alcohols such as methanol, ethanol, and propanol; ketones such as acetone, methyl ethyl ketone (MEK), and methyl isobutyl ketone (MIBK); hydrochlorocarbons such as chloromethane, dichloromethane, chloroform, and trichloroethylene; carbon tetrachloride; hydrofluorocarbons such as 1,1,1,2-tetrafluoroethane, 1,1-difluoroethane, 1,1,1,3,3-pentafluoropropane, and 1,1,1,2,3,3-hexafluoropropane; and hydrochlorofluorocarbons such as 1,1-dichloro-1-fluoroethane, 1,1-dichloro-2,2,3,3,3-pentafluoropropane, 1,3-dichloro-1,1,2,2,3-pentafluoropropane, and 1,1-dichloro-3,3,3-trifluoroethane.

In the second PTFE composition, the organic solvent is preferably in an amount of 500 ppb by mass or less, more preferably 100 ppb by mass or less, still more preferably less than 100 ppb by mass, further more preferably 10 ppb by mass or less, particularly preferably 1 ppb by mass or less, relative to the PTFE composition. The lower limit may be, but is not limited to, lower than the detection limit.

The amount of the organic solvent can be measured by headspace sampling GC/MS analysis. Specifically, 1 g of a sample is heated at 200° C. for 30 minutes in a headspace and subjected to measurement using Agilent 5977A (column DB-624). The detection limit in this analysis is 100 ppb by mass.

The second PTFE composition is preferably in the form of powder.

The second PTFE composition in the form of powder preferably has an average particle size of 250 μm or greater, more preferably 300 μm or greater, still more preferably 400 μm or greater, while preferably 1000 μm or smaller, more preferably 800 μm or smaller, still more preferably 600 μm or smaller.

The average particle size is measured in conformity with JIS K6891.

The second PTFE composition preferably has an extrusion pressure of 60 MPa or lower, more preferably 50 MPa or lower, while preferably 10 MPa or higher, at a reduction ratio (RR) of 400.

The extrusion pressure is measured by the following method. To 60 g of the PTFE composition is added 12.3 g of hydrocarbon oil Isopar-G (available from ExxonMobil), which serves as an extrusion aid. They are uniformly mixed in a sealed container and aged at room temperature (25±2° C.) for one hour. Then, the mixture is charged into a cylinder of an extruder (provided with a mold having a reduction ratio of 400) in conformity with ASTM D4895 and maintained at room temperature for one minute. Immediately thereafter, a load of 5.7 MPa is applied to a piston inserted into the cylinder and the mixture is immediately extruded through an orifice at room temperature and a ram speed of 20 mm/min. The value obtained by dividing the load (N) at which the pressure is in equilibrium during the extrusion operation by the cylinder cross-sectional area is defined as the extrusion pressure (MPa).

The second PTFE composition can be produced by the aforementioned production method of the invention.

Molding the first or second PTFE composition can provide a molded article. The molding may be performed by any method, and a known method may be used.

The first and second PTFE compositions may be applied to production of an electrically conductive tube, a thermally conductive film, a substrate for CCL, an electrode of a battery, a pre-colorant for PTFE, and the like. The "CCL" as used herein refers to a copper-clad laminate.

Specifically, the first and second polytetrafluoroethylene compositions each may be used to provide an electrically conductive tube by a known method. For example, the first or second polytetrafluoroethylene composition is uniformly mixed with an auxiliary agent and aged at a predetermined temperature for a predetermined period of time, and then molded into a tube, whereby an electrically conductive tube can be produced. An electrically conductive tube obtained using the first or second polytetrafluoroethylene composition is obtained at a higher yield and has a smoother tube wall, a continuous, more uniform electrically conductive layer, and better electrical conductivity than electrically conductive tubes obtained using a polytetrafluoroethylene composition produced by mechanical mixing or coagulation mixing.

The first and second polytetrafluoroethylene compositions each may be used to provide a thermally conductive film by a known method. For example, a polytetrafluoroethylene composition produced by the production method of the invention is uniformly mixed with an auxiliary agent and aged at a predetermined temperature for a predetermined period of time, and then pre-molded. The workpiece is then extruded into a rod using an extruder and rolled using rollers, whereby a thermally conductive film can be produced. A thermally conductive film obtained using the first or second polytetrafluoroethylene composition is obtained at a higher yield and has a smoother surface, more stable and uniform electrical conductivity and heat-radiating power, more significantly improved characteristics such as mechanical strength, and a longer lifetime than thermally conductive films obtained using a polytetrafluoroethylene composition produced by mechanical mixing.

Further, the first and second polytetrafluoroethylene compositions each may be used to provide a substrate for CCL by a known method. For example, the first or second polytetrafluoroethylene composition is uniformly mixed with an auxiliary agent and aged at a predetermined temperature for a predetermined period of time, and then pre-molded. The workpiece is then extruded into a rod using an extruder and rolled using rollers, whereby a film is produced. A plurality of such films produced is subjected to heat lamination, whereby a substrate for CCL can be produced. A substrate for CCL obtained using the first or second polytetrafluoroethylene composition has significantly improved stability of dielectric performance and stability of size than substrates for CCL obtained using a polytetrafluoroethylene composition produced by mechanical mixing.

The electrically conductive tube can be used as an electrically conductive oil tube for vehicles, for example. The thermally conductive film can be used for a heating cushion for vehicles, for example. The substrate for CCL can be used for a printed circuit board, for example.

The method for producing a polytetrafluoroethylene composition of the invention includes mixing a polytetrafluoroethylene resin and a filler using an airflow mixer to provide a polytetrafluoroethylene composition containing the polytetrafluoroethylene resin and the filler.

In the production method of the invention, polytetrafluoroethylene resin and a filler are mixed using an airflow mixer. Neither mechanical transmission nor shearing occurs in the course of mixing with an airflow mixer, which is particularly suitable for a PTFE dispersion resin. Further, the compressed air enables de-coacervation of the materials in the form of coagulum or coacervate. Thereby, the production method of the invention can provide a polytetrafluoroethylene composition in which the polytetrafluoroethylene and the filler are uniformly mixed without coacervation.

In other words, the production method of the invention enables mixing of polytetrafluoroethylene with filler without excessive formation of polytetrafluoroethylene fibers, and thus can provide a polytetrafluoroethylene composition in which the polytetrafluoroethylene and the filler are uniformly mixed.

In the production method of the invention, the filler preferably covers surfaces of particles of the polytetrafluoroethylene resin. In the invention, the airflow mixer is used for mixing. This can prevent excessive formation of fibers of the polytetrafluoroethylene resin, which is sensitive to shearing, and enables more uniform mixing of the polytetrafluoroethylene resin and the filler as well as uniform covering of surfaces of particles of the polytetrafluoroethylene resin with the filler.

In the invention, the airflow mixer is preferably a pulse-type airflow mixer. This can lead to an improved probability of contact between the PTFE and the filler in the course of mixing, thereby enabling more uniform mixing.

In the mixing in the production method of the invention, the pulse-type airflow mixer is preferably adjusted to have a pulse interval of 5 seconds or longer and 30 seconds or shorter. This can lead to an improved probability of contact between the PTFE and the filler in the course of mixing, thereby enabling more uniform mixing and improved production efficiency.

In the mixing in the production method of the invention, the pulse-type airflow mixer is preferably set to have a single pulse airflow duration of 0.8 seconds or longer and 2 seconds or shorter. This can lead to an improved probability of participation of PTFE at the bottom of the mixer in the mixing as well as sufficient mixing of the PTFE and the filler.

In the mixing in the production method of the invention, the pulse-type airflow mixer is preferably set to have a pulse count of 5 or more and 40 or less. This can lead to more sufficient and uniform mixing as well as improved mixing efficiency.

In the mixing in the production method of the invention, the airflow mixer is preferably set to have an intake pressure of 0.4 MPa or higher and 0.8 MPa or lower. This can lead to a large mixing space and more sufficient and uniform mixing, as well as elimination of material sticking to the upper portion of a mixing chamber and to a dust collector due to an excessive air pressure.

In the mixing in the production method of the invention, the airflow mixer is preferably such that the temperature inside a mixing chamber is controlled to fall within a range of 5° C. or higher and 30° C. or lower. This can lead to improved fluidity of the particles and improved mixing efficiency.

In the mixing in the production method of the invention, the airflow mixer is more preferably such that the temperature inside the mixing chamber is controlled to fall within a range of 5° C. or higher and 19° C. or lower. The temperature may be controlled by any method. For example, the inside of the mixing chamber can be controlled to low temperature by circulation of a coolant or with a freezing air dryer, thereby enabling better mixing effects.

In the production method of the invention, the polytetrafluoroethylene resin preferably includes a polytetrafluoroethylene dispersion resin. A polytetrafluoroethylene dispersion resin is commonly more sensitive to shearing, but the production method of the invention involves no shearing, which is more suitable for mixing of the polytetrafluoroethylene dispersion resin and the filler.

In the production method of the invention, preferably, the filler includes a functional filler or toner powder and the functional filler includes one or more organic fillers selected from aramid fiber, polyphenyl ester, polyphenylene sulfide, polyimide, polyether ether ketone, polyphenylene, polyamide, and wholly aromatic polyester resin or one or more inorganic fillers selected from metal powder, graphite, carbon black, coke, carbon powder, carbon fiber, graphene, carbon nanotube, ceramic, talc, mica, aluminum oxide, zinc oxide, tin oxide, titanium oxide, silicon oxide, calcium carbonate, calcium oxide, magnesium oxide, potassium titanate, glass fiber, glass pieces, glass beads, silicon carbide, calcium fluoride, boron nitride, barium sulfate, molybdenum disulfide, and potassium carbonate whiskers. Different types of fillers may be used in combination. Even for the same type of fillers, those having different shapes or sizes may be used in combination.

In the mixing in the production method of the invention, the filler is preferably added in an amount of 0.1% by weight or more and 60% by weight or less relative to a total amount of the polytetrafluoroethylene resin and the filler. This can lead to improved performance of a final molded article.

In the mixing in the production method of the invention, the filler preferably has a particle size of 10 nm or greater and 100 μm or smaller. This enables more uniform mixing.

In the mixing in the production method of the invention, the polytetrafluoroethylene resin and the filler preferably have a load factor of 0.2 or higher and 0.6 or lower. This can ensure a sufficient mixing space and lead to improved mixing effects, and can also ensure a space density of the PTFE and the filler in the mixing chamber and lead to an improved probability of contact therebetween and improved mixing efficiency.

The production method of the invention can provide a polytetrafluoroethylene composition in which a polytetrafluoroethylene resin and a filler are uniformly mixed without coacervation. Use of the polytetrafluoroethylene composition can provide an electrically conductive tube, thermally conductive film, and substrate for CCL exhibiting good performance.

The invention also relates to a polytetrafluoroethylene composition containing particles of a polytetrafluoroethylene resin and a filler covering surfaces of the particles, the polytetrafluoroethylene composition being substantially free from an organic solvent, the polytetrafluoroethylene resin including a fibrillatable polytetrafluoroethylene dispersion resin, the filler having a coverage of 50% or higher and 100% or lower on the surfaces of the particles. The polytetrafluoroethylene composition can provide a molded article that can sufficiently exert the characteristics derived from the filler. The polytetrafluoroethylene composition can also provide a molded article that less suffers defects such as scratches, tears, cracks, or holes and that has excellent strength and durability.

In the polytetrafluoroethylene composition, the particles of the polytetrafluoroethylene resin preferably have an average particle size of 250 μm or greater and 800 μm or smaller.

In the polytetrafluoroethylene composition, the filler preferably has a smaller average particle size than the particles of the polytetrafluoroethylene resin.

In the polytetrafluoroethylene composition, preferably, the filler includes a functional filler or toner powder and the functional filler includes one or more organic fillers selected from aramid fiber, polyphenyl ester, polyphenylene sulfide, polyimide, polyether ether ketone, polyphenylene, polyamide, and wholly aromatic polyester resin or one or more inorganic fillers selected from metal powder, graphite, carbon black, coke, carbon powder, carbon fiber, graphene, carbon nanotube, ceramic, talc, mica, aluminum oxide, zinc oxide, tin oxide, titanium oxide, silicon oxide, calcium carbonate, calcium oxide, magnesium oxide, potassium titanate, glass fiber, glass pieces, glass beads, silicon carbide, calcium fluoride, boron nitride, barium sulfate, molybdenum disulfide, and potassium carbonate whiskers.

More preferably, the filler includes a functional filler or toner powder and the functional filler includes one or more organic fillers selected from polyphenyl ester, polyphenylene sulfide, polyimide, polyether ether ketone, polyphenylene, polyamide, and wholly aromatic polyester resin or one or more inorganic fillers selected from metal powder, graphite, carbon black, coke, carbon powder, graphene, carbon nanotube, ceramic, talc, mica, aluminum oxide, zinc oxide, tin oxide, titanium oxide, silicon oxide, calcium carbonate, calcium oxide, magnesium oxide, potassium titanate, glass pieces, glass beads, silicon carbide, calcium fluoride, boron nitride, barium sulfate, molybdenum disulfide, and potassium carbonate whiskers.

In the polytetrafluoroethylene composition, the filler is preferably contained in an amount of 0.1% by weight or more and 60% by weight or less relative to a total amount of the particles of the polytetrafluoroethylene resin and the filler.

The polytetrafluoroethylene composition is preferably in the form of powder.

The polytetrafluoroethylene composition preferably has an average particle size of 250 μm or greater and 1000 μm or smaller.

The invention also relates to a molded article, electrically conductive tube, thermally conductive film, and substrate for CCL each obtainable with the polytetrafluoroethylene composition.

EXAMPLES

Example 1

Figure 3:
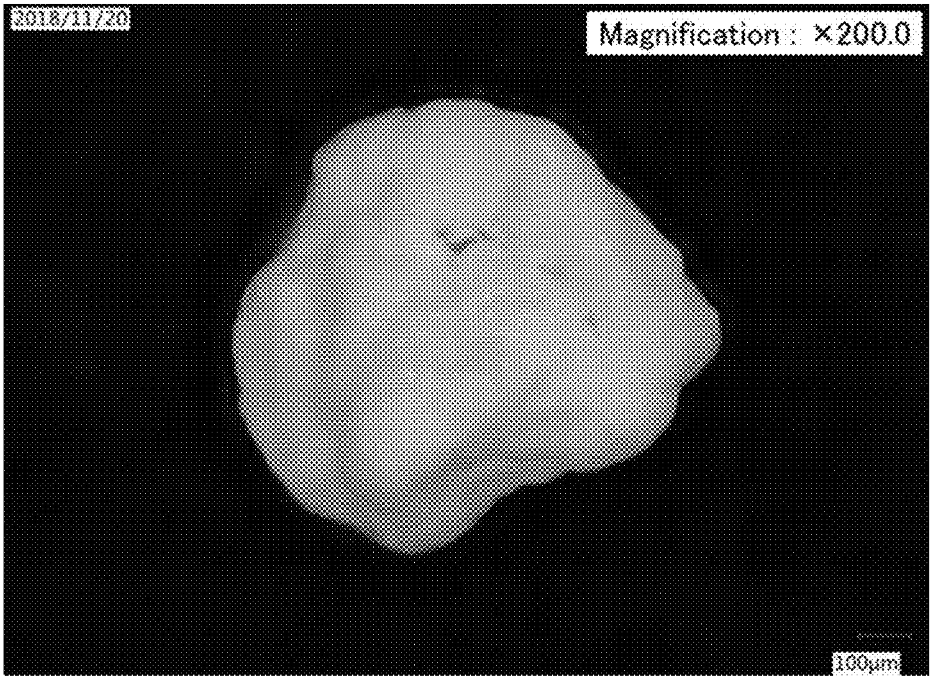
FIG. 3 is an optical micrograph (magnification: 200×) of PTFE before mixing used in Examples 1 to 5.

The materials for mixing used were a PTFE resin having a particle size of about 550 μm and a carbon black, serving as a filler, having a particle size of 50 nm. FIG. 3 shows an optical micrograph of the PTFE before mixing. The PTFE resin and the carbon black were fed into a mixing chamber of a pulse-type airflow mixer such that the load factor was 0.2. The amount of the carbon black added was 3% by weight relative to the total amount of the PTFE and the carbon black. The mixing chamber was closed, and the intake pressure was adjusted to 0.4 MPa, the pulse interval was adjusted to 20 seconds, the single pulse airflow duration was set to 0.8 seconds, and the pulse count was set to 20. Then, a temperature control system (circulation of coolant) was started and the temperature of the mixing chamber was decreased to 19° C. Completion of the parameter setting was followed by start of mixing. After the mixing was completed, the air pump was closed, the mixing chamber was opened, and the mixture was taken.

Figure 4A:
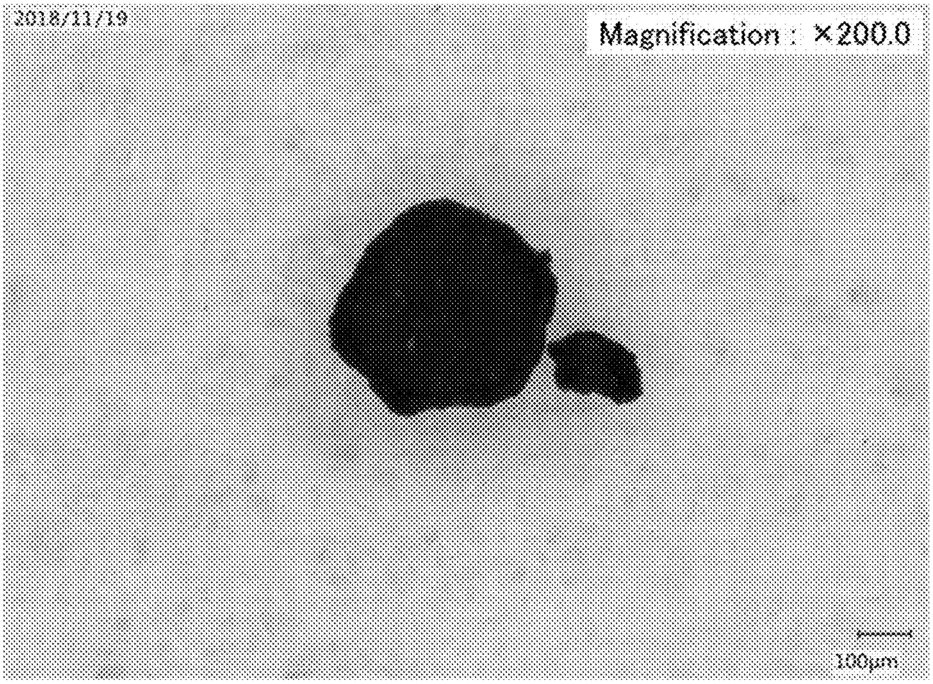
FIGS. 4A and 4B include optical micrographs of a PTFE-carbon black composite particle obtained by the production method of Example 1.
Figure 4B:
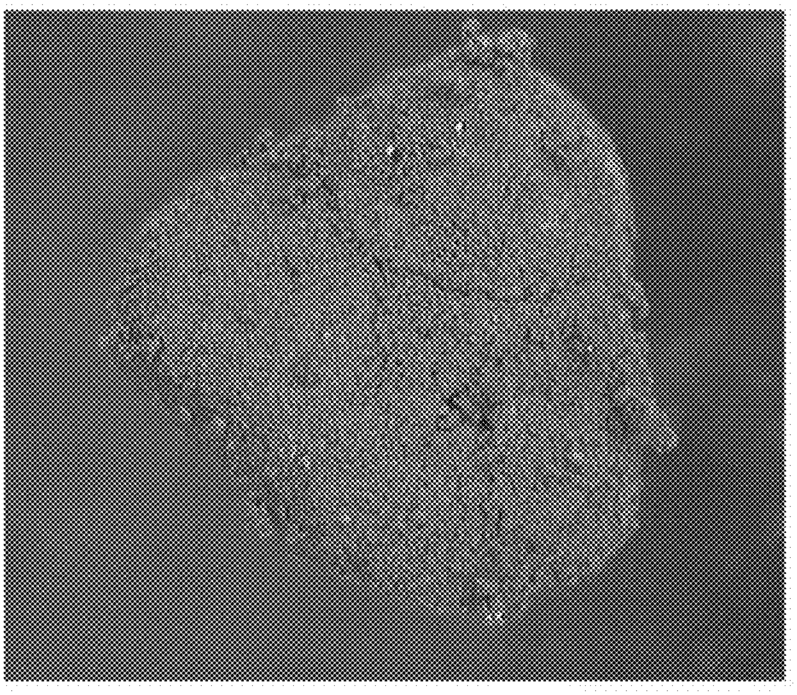

FIGS. 4A and 4B include optical micrographs of particles in the composition after the mixing obtained in Example 1. The figure clearly shows that the carbon black uniformly covers surfaces of the PTFE after the mixing.

Example 2

The procedure was performed as in Example 1 except that the load factor, the intake pressure, the pulse interval, the single pulse airflow duration, the pulse count, and the mixing temperature were set to the values shown in Table 1.

Figure 5:
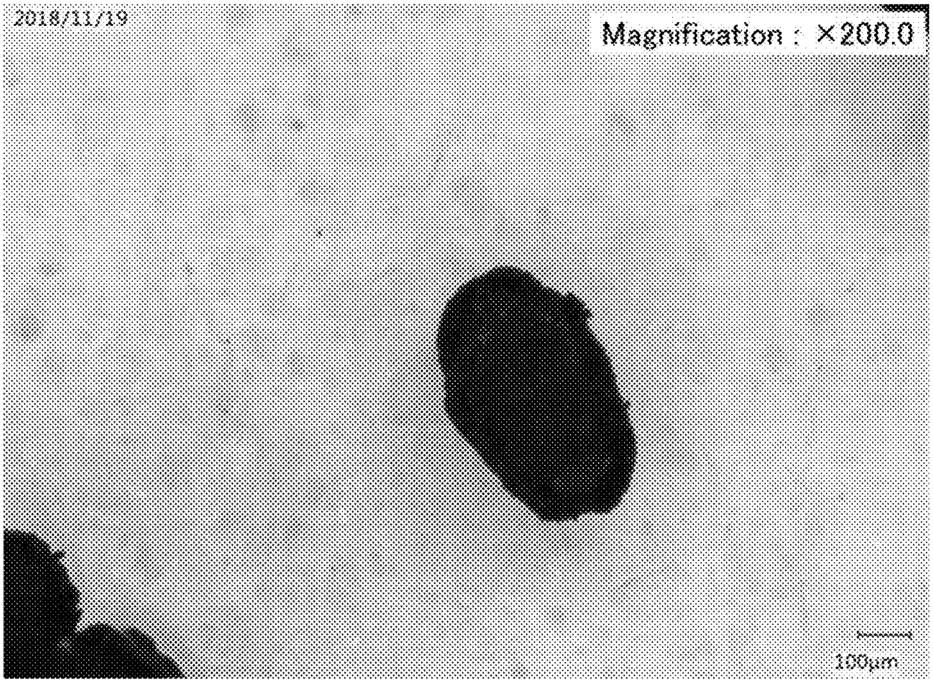
FIG. 5 is an optical micrograph (magnification: 200×) of a PTFE-carbon black composite particle obtained by the production method of Example 2.

FIG. 5 shows an optical micrograph of a particle in the composition after the mixing obtained in Example 2. The figure clearly shows that the carbon black uniformly covers surfaces of the PTFE after the mixing.

Example 3

The procedure was performed as in Example 1 except that the load factor, the intake pressure, the pulse interval, the single pulse airflow duration, the pulse count, and the mixing temperature were set to the values shown in Table 1.

Figure 6:
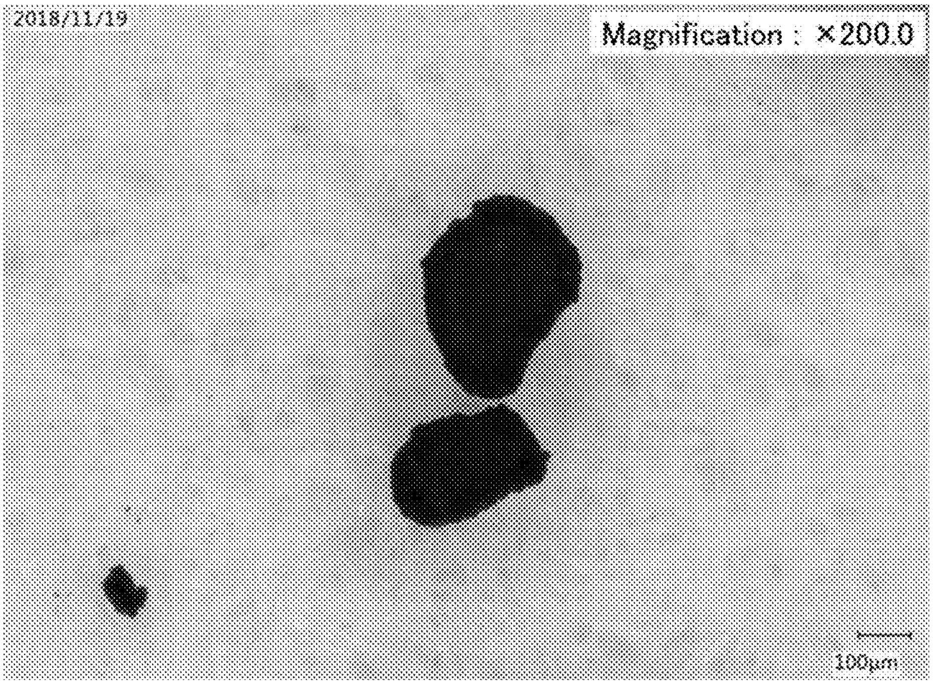
FIG. 6 is an optical micrograph (magnification: 200×) of PTFE-carbon black composite particles obtained by the production method of Example 3.

FIG. 6 shows an optical micrograph of particles in the composition after the mixing obtained in Example 3. The figure clearly shows that the carbon black uniformly covers surfaces of the PTFE after the mixing.

Example 4

The procedure was performed as in Example 1 except that the load factor, the intake pressure, the pulse interval, the single pulse airflow duration, the pulse count, and the mixing temperature were set to the values shown in Table 1.

Figure 7A:
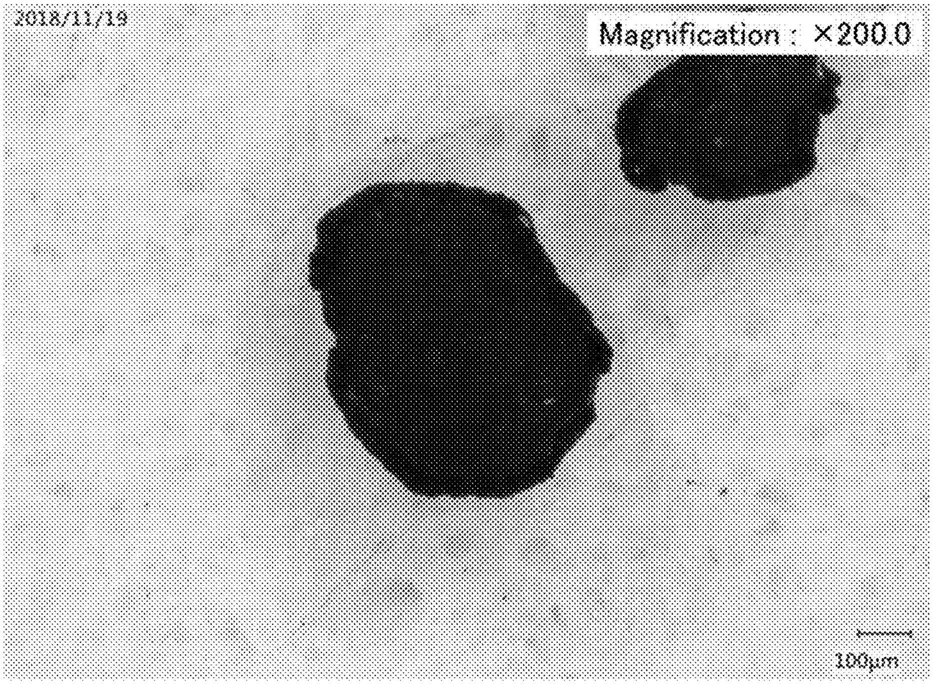
FIGS. 7A and 7B include optical micrographs of PTFE-carbon black composite particles obtained by the production method of Example 4.
Figure 7B:
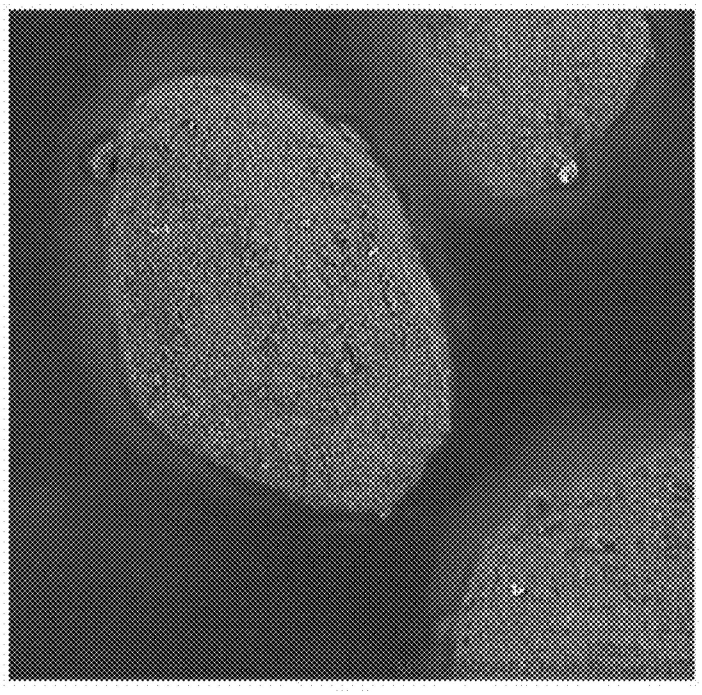

FIG. 7 includes optical micrographs of particles in the composition after the mixing obtained in Example 4. The figure clearly shows that the carbon black uniformly covers surfaces of the PTFE after the mixing.

Example 5

The procedure was performed as in Example 1 except that the load factor, the intake pressure, the pulse interval, the single pulse airflow duration, the pulse count, and the mixing temperature were set to the values shown in Table 1.

Figure 8:
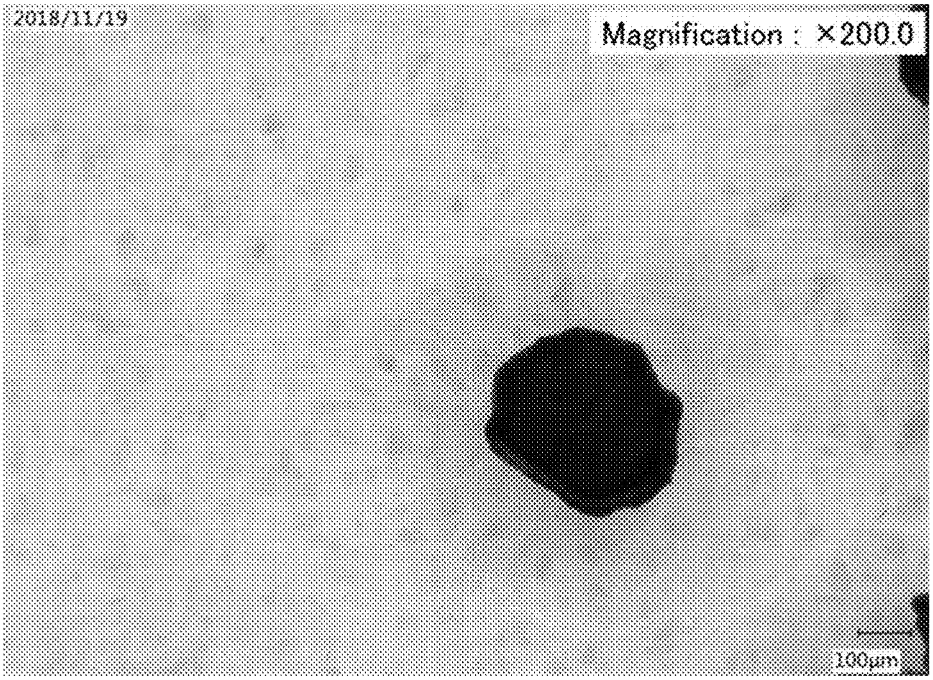
FIG. 8 is an optical micrograph (magnification: 200×) of a PTFE-carbon black composite particle obtained by the production method of Example 5.

FIG. 8 shows an optical micrograph of a particle in the composition after the mixing obtained in Example 5. The figure clearly shows that the carbon black uniformly covers surfaces of the PTFE after the mixing.

TABLE 1

| | Mixing temperature (° C.) | Load factor | Pulse interval (s) | Single pulse airflow duration (s) | Pulse count | Intake pressure (MPa) |
|---|---|---|---|---|---|---|
| Example 1 | 19 | 0.2 | 20 | 0.8 | 20 | 0.4 |
| Example 2 | 19 | 0.4 | 25 | 1.2 | 30 | 0.6 |
| Example 3 | 19 | 0.6 | 30 | 1.5 | 40 | 0.8 |
| Example 4 | 30 | 0.4 | 25 | 1.2 | 30 | 0.6 |
| Example 5 | 5 | 0.4 | 10 | 2.0 | 5 | 0.8 |

Example 6

The materials for mixing used were a PTFE resin having a particle size of about 28 μm and a carbon fiber (particle size: 10 μm, average aspect ratio: 10:1) serving as a filler. The PTFE resin and the carbon fiber were fed into a mixing chamber of a pulse-type airflow mixer such that the load factor was 0.3. The amount of the carbon fiber added was 15% by weight relative to the total amount of the PTFE and the carbon fiber. The mixing chamber was closed, and the intake pressure was adjusted to 0.6 MPa, the pulse interval was adjusted to 5 seconds, the single pulse airflow duration was set to 1.5 seconds, and the pulse count was set to 10. Then, a temperature control system (circulation of coolant) was started and the temperature of the mixing chamber was decreased to 15° C. Completion of the parameter setting was followed by start of mixing. After the mixing was completed, the air pump was closed, the mixing chamber was opened, and the mixture was taken.

Figure 9:
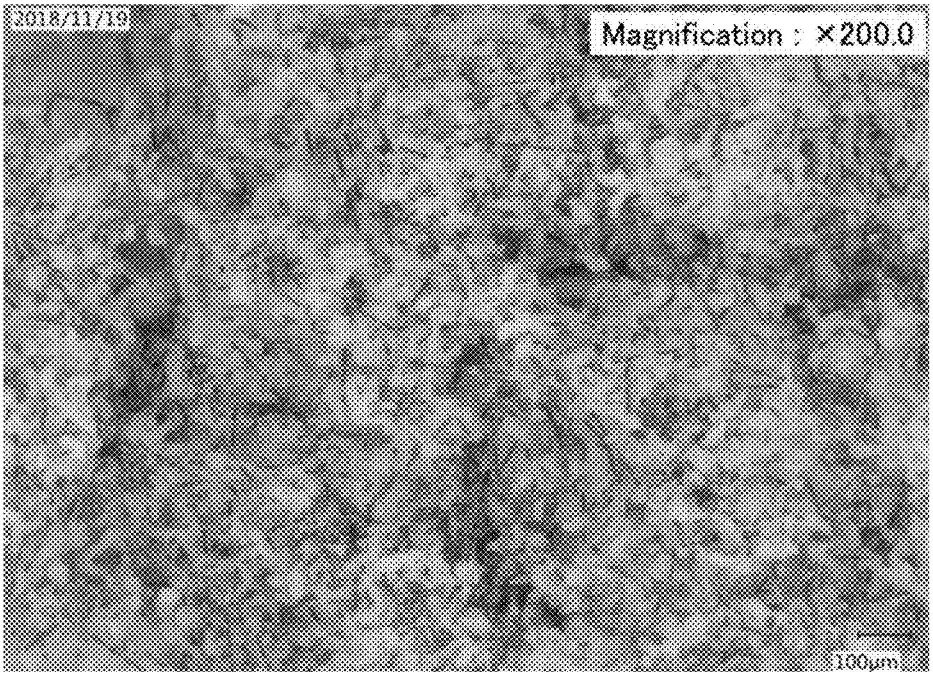
FIG. 9 is an optical micrograph (magnification: 200×) of PTFE-carbon fiber composite particles obtained by the production method of Example 6.

FIG. 9 shows an optical micrograph of particles in the composition after the mixing obtained in Example 6. The figure clearly shows that the particles of the PTFE resin and the carbon fiber were uniformly mixed.

TABLE 2

| | Mixing temperature (° C.) | Load factor | Pulse interval (s) | Single pulse airflow duration (s) | Pulse count | Intake pressure (MPa) |
|---|---|---|---|---|---|---|
| Example 6 | 15 | 0.3 | 5 | 1.5 | 10 | 0.6 |

Example 7

The materials for mixing used were a PTFE resin having a particle size of about 550 μm and a carbon black, serving as a filler, having a particle size of 50 nm. The PTFE resin and the carbon black were fed into a mixing chamber of a pulse-type airflow mixer such that the load factor was 0.4. The amount of the carbon black added was 3% by weight relative to the total amount of the PTFE and the carbon black. The mixing chamber was closed, and the intake pressure was adjusted to 0.6 MPa, the pulse interval was adjusted to 25 seconds, the single pulse airflow duration was set to 1.2 seconds, and the pulse count was set to 30. Then, a temperature control system was started and the temperature of the mixing chamber was decreased to 19° C. Completion of the parameter setting was followed by start of mixing. After the mixing was completed, the air pump was closed, the mixing chamber was opened, and the mixture was taken. Thereby, a PTFE composition of Example 7 was obtained.

Example 8

The materials for mixing used were a PTFE resin having a particle size of about 550 μm, a conductive carbon black, serving as a filler, having a particle size of 36 nm, and a graphite, serving as a filler, having a particle size of 26 μm. The PTFE resin, the conductive carbon black, and the graphite were fed into a mixing chamber of a pulse-type airflow mixer such that the load factor was 0.5. The amount of the conductive carbon black added was 15% by weight relative to the total amount of the PTFE, the carbon black, and the graphite and the amount of the graphite added was 10% by weight relative to the total amount of the PTFE, the carbon black, and the graphite. The mixing chamber was closed, and the intake pressure was adjusted to 0.5 MPa, the pulse interval was adjusted to 30 seconds, the single pulse airflow duration was set to 1.2 seconds, and the pulse count was set to 30. Then, a temperature control system (circulation of coolant) was started and the temperature of the mixing chamber was decreased to 19° C. Completion of the parameter setting was followed by start of mixing. After the mixing was completed, the air pump was closed, the mixing chamber was opened, and the mixture was taken. Thereby, a PTFE composition of Example 8 was obtained.

Example 9

The materials for mixing used were a PTFE resin having a particle size of about 550 μm and a ceramic powder, serving as a filler, having a particle size of 20 nm. The PTFE resin and the ceramic powder were fed into a mixing chamber of a pulse-type airflow mixer such that the load factor was 0.35. The amount of the ceramic powder added was 50% by weight relative to the total amount of the PTFE and the ceramic powder. The mixing chamber was closed, and the intake pressure was adjusted to 0.7 MPa, the pulse interval was adjusted to 20 seconds, the single pulse airflow duration was set to 1.5 seconds, and the pulse count was set to 30. Then, a temperature control system (circulation of coolant) was started and the temperature of the mixing chamber was decreased to 19° C. Completion of the parameter setting was followed by start of mixing. After the mixing was completed, the air pump was closed, the mixing chamber was opened, and the mixture was taken. Thereby, a PTFE composition of Example 9 was obtained.

TABLE 3

| | Mixing temperature (° C.) | Load factor | Pulse interval (s) | Single pulse airflow duration (s) | Pulse count | Intake pressure (MPa) |
|---|---|---|---|---|---|---|
| Example 7 | 19 | 0.4 | 25 | 1.2 | 30 | 0.6 |
| Example 8 | 19 | 0.5 | 30 | 1.2 | 30 | 0.5 |
| Example 9 | 19 | 0.35 | 20 | 1.5 | 30 | 0.7 |

Comparative Example 1 (Mechanical Mixing)

The PTFE resin and the filler (carbon black) used were the same as in Example 1. The PTFE resin and the carbon black were fed at a ratio by mass of 3% into a mixing chamber of a mechanical stirrer provided with a stirring structure. The volume of the materials was ⅓ or less the capacity of the mixing chamber. The angle and height of a spoiler were adjusted and the mixing chamber was closed. The number of rotations was adjusted to 1200 r/min and the mixing duration was set to 120 seconds, and then mixing was started. After the mixing was completed, the mixture was taken.

FIG. 1 shows an optical micrograph of a particle in the composition after the mixing obtained in Comparative Example 1. The figure clearly shows that the PTFE resin formed fibers.

Comparative Example 2 (Coagulation Mixing)

The PTFE resin and the filler (carbon black) used were the same as in Example 1. The carbon black at a ratio by mass of 3% was added to a liquid mixture of ethanol and water (ratio by volume of ethanol:water=1:2.5) and ultrasonically dispersed therein. Thereby, a pre-dispersion of the carbon black was obtained. The carbon black pre-dispersion was mechanically stirred at a low speed for two minutes, and thereto was gently added an undiluted PTFE dispersion. The mixture was stirred for three minutes, and a small amount of a coagulant was then added while the number of rotations was increased. Thereby, a large amount of the mixture coagulated. The mixture was stirred for 10 minutes, and then the stirring was stopped. The mixture was filtered, so that most of the solvent was removed. The residue was dried at 100° C. for 24 hours or longer, whereby a PTFE composition of Comparative Example 2 was obtained.

Figure 2:
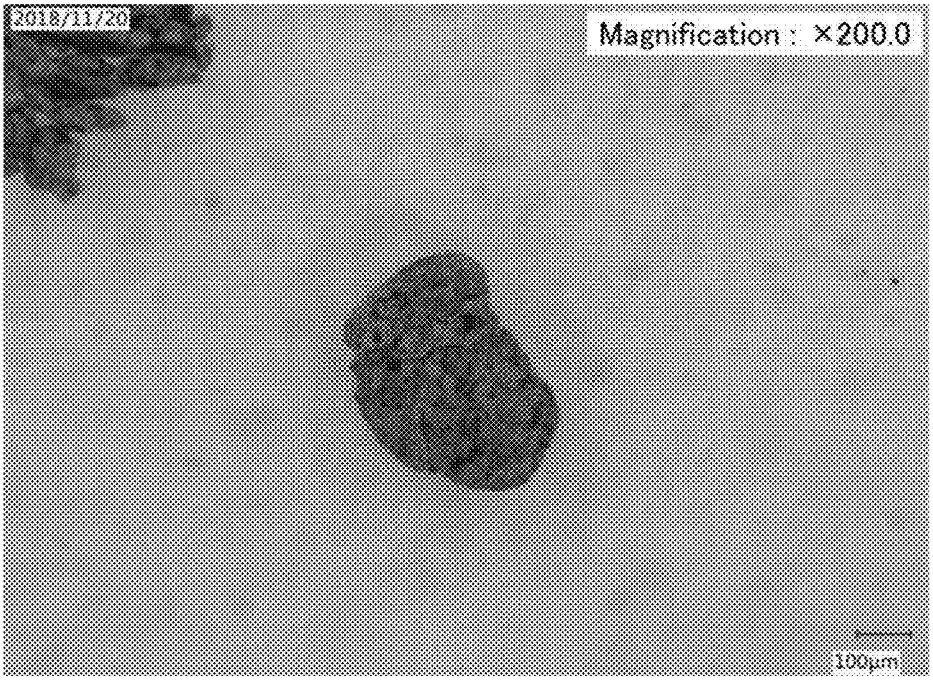
FIG. 2 is an optical micrograph (magnification: 200×) of a PTFE-carbon black composite particle obtained by wet mixing in a conventional technique (Comparative Example 2).

FIG. 2 shows an optical micrograph of a particle in the composition after the mixing obtained in Comparative Example 2. The figure clearly shows that most of the carbon black was enveloped inside the PTFE resin.

The PTFE compositions produced in Examples 7 to 9 were used to produce the products of the following Examples A to C, and the performance of these products were evaluated by the following methods.

<Performance Evaluation>

1. Current Value

In the invention, the electrically conductive tube obtained was cut to prepare a 500-mm piece. A direct current voltage of 1000 V was applied to the ends of the piece, and the current value at this time was measured using a multimeter.

The higher the current value is, the lower the resistance of the material is and the higher the electrical conductivity thereof is.

2. Volume Resistivity

The volume resistivity indicates the resistance of the material to a current per unit volume.

In the invention, the volume resistivity of the thermally conductive film obtained was measured in conformity with the standard GB/T1410-2006. Specifically, the thermally conductive film was processed into a test sheet having a size of 70 mm×50 mm×0.13 mm (a*b*h). The test sheet was placed on a test stage and the nut was adjusted to strongly press the test sheet. A voltage of 500 V was applied to the test sheet and the resistance $R_x$ of the test sheet was measured using a digital four-point probe tester ST2258C. Then, the volume resistivity (unit: Ω·cm) was calculated by the formula: $\rho_v = R_x * a * b / h$.

The higher the volume resistivity is, the higher the insulation of the material is and the lower the electrical conductivity thereof is. In the invention, the volume resistivity is preferably lower than 0.8 Ω·cm.

3. Tensile Strength TS and Elongation Percentage at Break EL

The tensile strength indicates the capability of the material to resist permanent deformation and damage due to the action of external force. The elongation percentage at break indicates the ratio between the displacement at which a sample is stretched to break and the original length of the sample.

In the invention, the tensile strength and elongation percentage at break of the thermally conductive film obtained were measured using a universal tensile tester Instron 3366 in conformity with the standard ASTM D4894. Specifically, the thermally conductive film was processed into a dumbbell-shaped test sheet. The gauge length L0 was defined, and the width a and the thickness b of the test sheet were measured. Then, the test sheet was placed on a jig. The displacement and the stress were set to 0, and the measurement was then started. The test sheet was stretched at a tensile rate of 50 mm/min until break. The stress F and the length L1 at break were recorded. The following formulas were used to calculate the tensile strength and the elongation percentage at break.

$$\text{Tensile strength TS} = F/(a \times b)$$

$$\text{Elongation percentage at break EL} = (L1 - L0)/L0 \times 100\%$$

The higher the tensile strength is, the higher the mechanical strength of the material is. The higher the elongation percentage at break is, the higher the toughness of the material is. In the invention, preferably, the tensile strength is higher than 20 MPa and the elongation percentage at break is higher than 200%.

4. Temperature Drift

The temperature drift indicates the relative average change of permittivity with every temperature increase by 1° C. within a certain temperature range (−50° C. to 150° C.)

In the invention, the temperature drift of the substrate for CCL obtained was measured using the Agilent N5234A tester in conformity with the standard IPC-TM-650 2.5.5.5. Specifically, the substrate for CCL was processed into a test sheet having a size of 30 mm×70 mm×0.8 mm. The test sheet was fixed with a jig and the Z-axis permittivity was measured at room temperature at 10 GHz. The measurement was repeated four or five times and the average value was calculated. Then, the measurement was repeated at different temperatures within the temperature range of −50° C. to 150° C. and a graph of the permittivity relative to the temperature was drawn. The slope of the resulting graph was obtained, which was defined as the temperature drift.

The lower the absolute value of the temperature drift is, the smaller the change of permittivity relative to the temperature is. This means the dielectric performance is more stable during practical use.

5. Coefficient of Thermal Expansion

The coefficient of thermal expansion indicates the relative amount of change in size of a subject with every temperature increase by 1° C.

In the invention, the coefficient of thermal expansion of the substrate for CCL obtained was measured in conformity with the standard IPC-TM-650 2.4. Specifically, the substrate for CCL was processed into a sample having a size of 6.35 mm×6.35 mm×0.8 mm, and the coefficient of thermal expansion of the sample was measured by static thermomechanical analysis (TMA).

The lower the coefficient of thermal expansion is, the smaller the amount of change in size of the material with temperature increase is and the higher the size stability of the product is. In the invention, the coefficient of thermal expansion is preferably (x, y, z)<(50, 50, 100). The expression "(x, y, z)" herein means that the dimensions increase in the longitudinal direction, in the width direction, and in the thickness direction respectively by x ppm, y ppm, and z ppm with every temperature increase by 1° C. The same applies in the following.

Example A

The PTFE composition obtained in Example 7 was uniformly mixed with an auxiliary agent oil, Isopar-G*[1]. The mixture was aged at 40° C. for 24 hours, and then molded into a tube. Thereby, an electrically conductive tube of Example A was obtained.

The extruder for the PTFE tube used during the molding was a product available from Tabata Industrial machinery Co., Ltd. The diameters of a steel cylinder and a core rod were respectively 100 mm and 20 mm, the diameters of a mold and a needle die were respectively 10.5 mm and 8.3 mm, the RR was 232, and the extrusion pressure at molding was 19 MPa.

Figure 10:
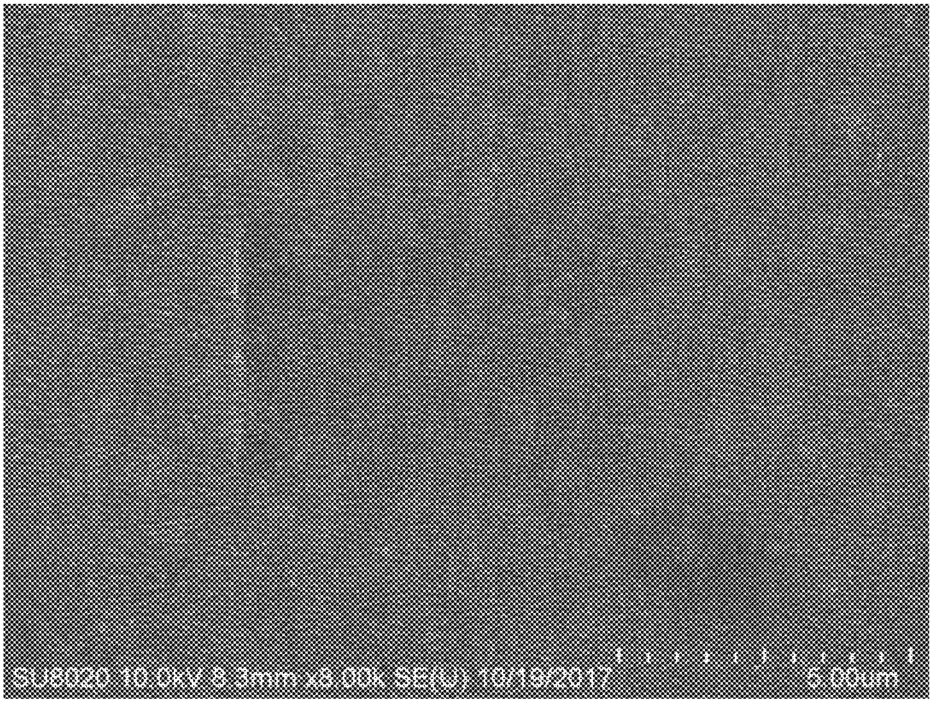
FIG. 10 is an optical micrograph (magnification: 8000×) of an electrically conductive tube obtained in Example A.

An optical microscope was used to observe the surface of the electrically conductive tube obtained in Example A at a magnification of 8000×, whereby an optical micrograph of the surface of the electrically conductive tube was obtained. The resulting photograph is shown in FIG. 10. FIG. 10 clearly shows that the electrically conductive tube obtained in Example A had a smooth surface and a continuous, uniform electrically conductive layer with no obvious scratches or tears.

The current value of the electrically conductive tube obtained in Example A was measured. The result obtained is shown in Table 4.

*1: Isopar-G is available from ExxonMobil and has a specific gravity of 0.748, a flash point of 440° C., and a boiling point of 167° C. to 176° C.

Comparative Example A'

An electrically conductive tube of Comparative Example A' was obtained as in Example A except that the PTFE composition obtained in Comparative Example 1 was used.

Figure 11:
FIG. 11 is an optical micrograph (magnification: 8000×) of an electrically conductive tube obtained in Comparative Example A'.

An optical micrograph of the surface of the electrically conductive tube of Comparative Example A' was obtained as in Example A. The resulting photograph is shown in FIG. 11. FIG. 11 clearly shows that the electrically conductive tube included fibers and small cracks. This has an influence on the life and compressive strength of the tube.

The current value of the electrically conductive tube of Comparative Example A' was measured as in Example A, and the result is shown in Table 4.

Comparative Example A"

An electrically conductive tube of Comparative Example A" was obtained as in Example A except that the PTFE composition obtained in Comparative Example 2 was used.

Figure 12:
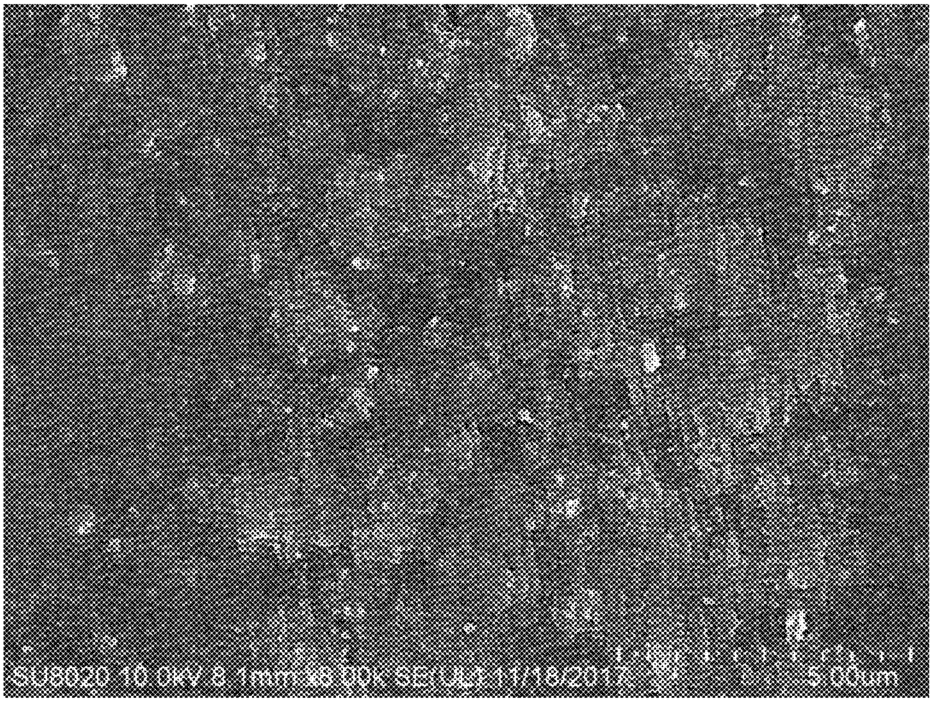
FIG. 12 is an optical micrograph (magnification: 8000×) of an electrically conductive tube obtained in Comparative Example A".

An optical micrograph of the surface of the electrically conductive tube of Comparative Example A" was obtained as in Example A. The resulting photograph is shown in FIG. 12. FIG. 12 clearly shows that the electrically conductive tube included many white coagula and the surface was significantly non-uniform. This is because the carbon black was enveloped in the PTFE resin.

The current value of the electrically conductive tube of Comparative Example A" was measured as in Example A, and the result is shown in Table 4.

TABLE 4

| | Measured current value |
|---|---|
| Example A | >400 mA |
| Comparative Example A' | 200 to 300 mA |
| Comparative Example A" | No current |

The results in Table 4 demonstrate that the electrically conductive tube produced using the polytetrafluoroethylene composition produced by the production method of the invention had a high current value, was uniform and stable, and exerted better electrical conductivity. In contrast, the electrically conductive tube produced using the polytetrafluoroethylene composition produced by mechanical mixing exerted a low current value. This indicates that the electrically conductive tube obtained in Comparative Example A' had high resistance and poor electrical conductivity. The tube produced using the polytetrafluoroethylene composition produced by coagulation mixing had no current value detected, which means the tube had no electrical conductivity and was not able to be used as an electrically conductive tube.

The product produced using the polytetrafluoroethylene composition produced by coagulation mixing had no electrical conductivity, and thus had no thermal conductivity. Accordingly, no thermally conductive film was produced using the polytetrafluoroethylene composition produced by coagulation mixing in the following experiments.

Example B

The PTFE composition obtained in Example 8 was uniformly mixed with an auxiliary agent oil Isopar-M*[2]. The mixture was aged at 40° C. for 24 hours and maintained at a pressure of 3 MPa for 20 minutes, whereby the mixture was pre-molded. The workpiece was then extruded into a rod having a diameter of 11 mm using an extruder at a pressure of about 5.2 MPa. The rod was then rolled using rollers, whereby a 0.13-mm film was produced. The film was then dried and sintered, whereby a thermally conductive PTFE film was obtained.

An optical microscope was used to observe the surface of the thermally conductive film obtained in Example B at magnifications of 50× and 600×, whereby optical micrographs of the surface of the thermally conductive film were obtained. The resulting photographs are shown in FIGS.

Figure 13A:
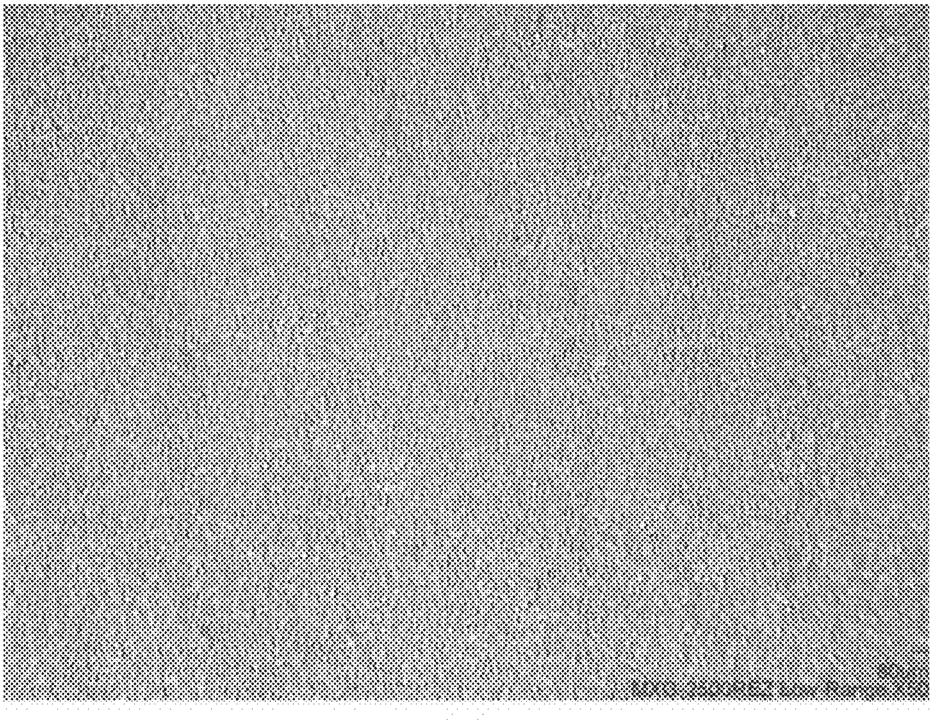
FIGS. 13A and 13B include optical micrographs of a thermally conductive film obtained in Example B.
Figure 13B:
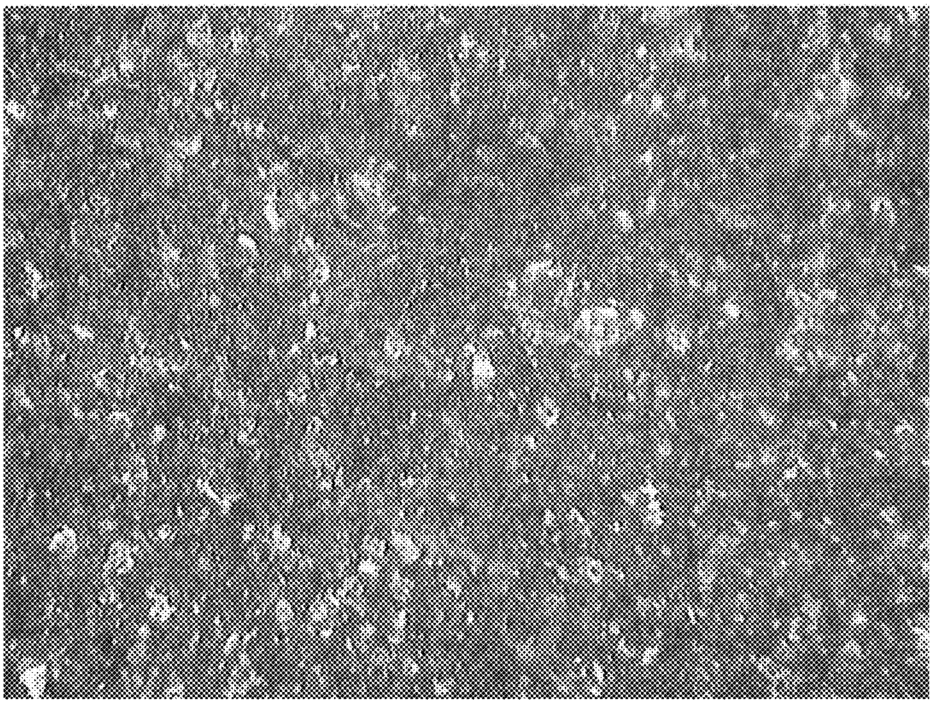

13A and 13B. FIGS. 13A and 13B clearly show that the thermally conductive film had a smooth and uniform surface with no holes.

The volume resistivity, tensile strength, elongation percentage at break, and coefficient of thermal expansion of the thermally conductive film obtained in Example B were measured. The results obtained are collectively shown in Table 5.

*2: Isopar-M is available from ExxonMobil and has a specific gravity of 0.79, a flash point of 92° C., and a boiling point of 225° C. to 254° C.

Comparative Example B'

A thermally conductive film of Comparative Example B' was obtained as in Example B except that the PTFE composition obtained in Comparative Example 1 was used.

Figure 14A:
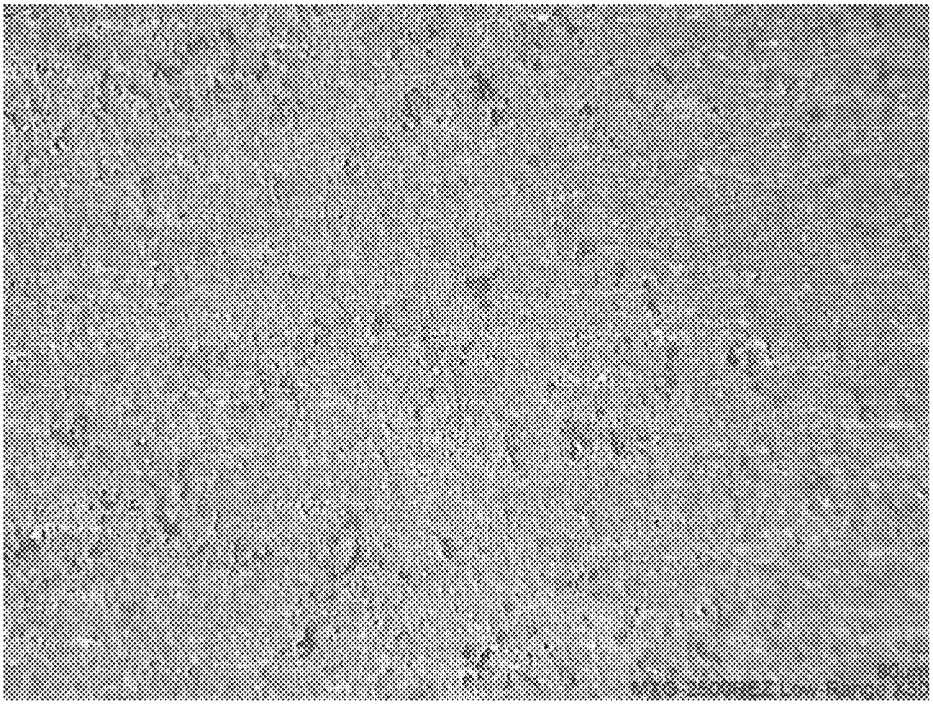
FIGS. 14A and 14B include optical micrographs of a thermally conductive film obtained in Comparative Example B'.
Figure 14B:
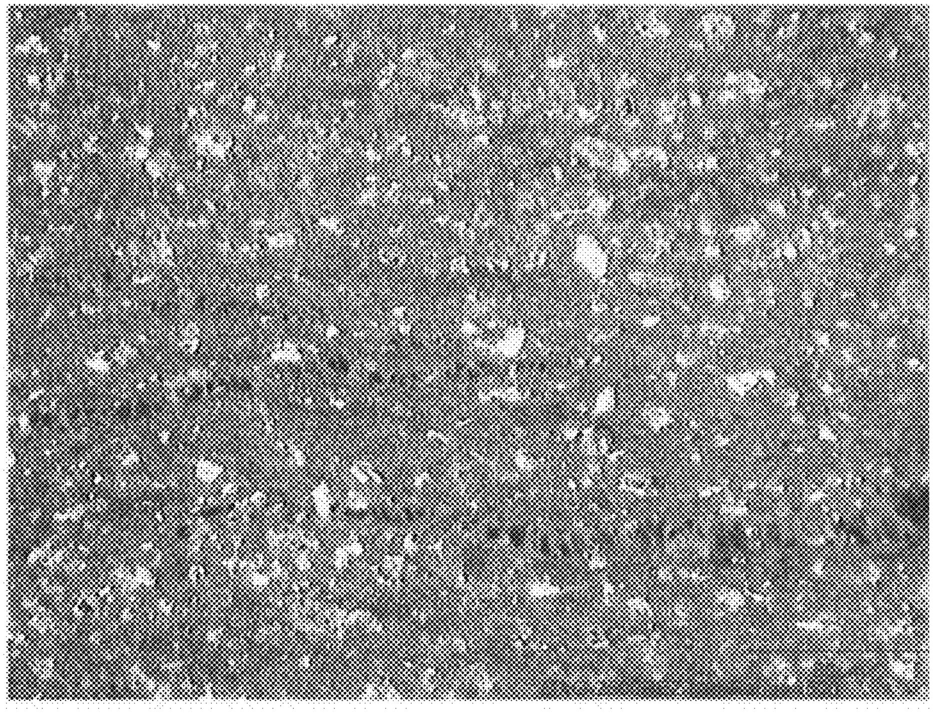

Optical micrographs of the surface of the thermally conductive film of Comparative Example B' were obtained as in Example B. The photographs obtained are shown in FIGS. 14A and 14B. FIGS. 14A and 14B clearly show that the thermally conductive film suffered a partially fiber-forming phenomenon and the film surface included holes. This causes insufficient mechanical strength, non-uniform heat generation as a whole, a risk of local overheating, and a short life.

The volume resistivity, tensile strength, elongation percentage at break, and coefficient of thermal expansion of the thermally conductive film obtained in Comparative Example B' were measured. The results obtained are collectively shown in Table 5.

TABLE 5

| | Volume resistivity (Ω · cm) | Tensile strength (MPa) | Elongation percentage at break (%) |
|---|---|---|---|
| Example B | 0.6 | 23 | 235 |
| Comparative Example B' | >1.5 | 14 | 175 |

The results in Table 5 demonstrate that the thermally conductive film produced using the polytetrafluoroethylene composition produced by the production method of the invention had a high mechanical strength and high toughness, which leads to a long life, low volume resistivity, high heat-radiating efficiency, and more uniform heat radiation. In contrast, the thermally conductive film produced using the polytetrafluoroethylene composition produced by mechanical mixing had a high volume resistivity, and thus had low heat-radiating efficiency and a short life.

Example C

The PTFE composition obtained in Example 9 was uniformly mixed with an auxiliary agent oil Isopar-M*2. The mixture was aged at 40° C. for 24 hours and maintained at a pressure of 3 MPa for 20 minutes, whereby the mixture was pre-molded. The workpiece was then extruded into a rod having a diameter of 16 mm using an extruder at a pressure of about 4 MPa. The rod was then rolled using rollers, whereby a 0.165-mm film was produced. The film was then dried and sintered, whereby a PTFE film was obtained. Eight PTFE films having the same size were produced and were subjected to heat lamination, whereby a 0.8-mm substrate for CCL was obtained.

The temperature drift and coefficient of thermal expansion of the substrate for CCL obtained in Example C were measured. The results obtained are collectively shown in Table 6.

Comparative Example C'

A substrate for CCL of Comparative Example C' was obtained as in Example C except that the PTFE composition obtained in Comparative Example 1 was used. The temperature drift and coefficient of thermal expansion of the substrate for CCL obtained in Comparative Example C' were measured. The results obtained are collectively shown in Table 6.

TABLE 6

| | Temperature drift (ppm/° C.) | Coefficient of thermal expansion (ppm/° C.) |
|---|---|---|
| Example C | −6 | (30, 30, 50) |
| Comparative Example C | −29 | (70, 70, 150) |

The results in Table 6 demonstrate that the substrate for CCL produced using the polytetrafluoroethylene composition produced by the production method of the invention had a low temperature drift and a small coefficient of thermal expansion, and thus had more stable dielectric characteristics and size stability during actual use, was advantageous in improvement of signal transmission efficiency, suffered less wear, and had a good effect of forming a composite with copper foil.

Experiment 1

For each of the PTFE compositions obtained in Example 1, Comparative Example 1, and Comparative Example 2 and the PTFE resin (the material of the PTFE compositions) used in Example 1 and Comparative Example 1, the fibrillatability was evaluated by paste extrusion testing.

To 60 g of the PTFE composition was added 12.3 g of Isopar-G as hydrocarbon oil, which serves as an extrusion aid. They were uniformly mixed in a sealed container and aged at room temperature (25±2° C.) for one hour.

Then, the mixture was subjected to paste extrusion testing using an extruder in conformity with ASTM D4895 and a mold at a reduction ratio of 400. In other words, the mixture was charged into a cylinder of the extruder and maintained at room temperature for one minute. Immediately thereafter, a load of 5.7 MPa was applied to a piston inserted into the cylinder and the mixture was immediately extruded through an orifice at room temperature and a ram speed of 20 mm/min. The state of the extrudate (referred to as bead) extruded through the orifice was observed and the extrusion pressure was measured.

The value obtained by dividing the load (N) at which the pressure was in equilibrium during the extrusion operation by the cylinder cross-sectional area was defined as the extrusion pressure (MPa).

The PTFE compositions obtained in Example 1 and Comparative Example 2 each provided a uniform paste extrudate. The extrusion pressure of each of the PTFE compositions obtained in Example 1 and Comparative Example 2 was higher by merely 20% than the extrusion pressure (33 MPa) of the material PTFE resin.

In contrast, the extrudate of the PTFE composition obtained in Comparative Example 1 was non-uniform, partially suffered cracks, and was twisted. In a tensile test on this extrudate (unsintered), the non-uniform portion caused substantial absence of strength and elongation, resulting in a break of the extrudate.

For the PTFE composition obtained in Comparative Example 1, the pressure was higher than the extrusion pressure of the material PTFE resin even at an initial stage of the extrusion. Further, the extrusion pressure was unstable and did not reach an equilibrium state. This leads to a failure in calculating the extrusion pressure.

The results of the paste extrusion testing demonstrate that the fibrillatability of each of the PTFE compositions obtained in Example 1 (airflow mixing) and Comparative Example 2 (coagulation mixing) was similar to that of the material PTFE resin, i.e., the results obtained were excellent.

In contrast, the fibrillatability of the PTFE composition obtained in Comparative Example 1 (mechanical mixing) was significantly poor.

Experiment 2

Each of the PTFE compositions obtained in Example 1 and Comparative Examples 1 and 2 was subjected to headspace sampling GC/MS analysis for the organic solvent contained in the PTFE composition.

Specifically, 1 g of a sample was heated at 200° C. for 30 minutes in a headspace and subjected to measurement using Agilent 5977A (column DB-624).

The analysis demonstrates that the PTFE compositions obtained in Example 1 and Comparative Example 1 contained no organic solvent (smaller than the detection limit). In contrast, ethanol (1.0 ppm by mass) was detected in the PTFE composition obtained in Comparative Example 2.

Comparative Example 3

A PTFE composition containing a PTFE resin, carbon black, and graphite was obtained in conformity with Examples 4 and 5 disclosed in JP H08-253600 A.

The PTFE resin used was the PTFE resin that was used in Example 8 and in the form of aqueous dispersion. The conductive carbon black and the graphite used were the same as those in Example 8.

The mixing ratio of the conductive carbon black and the graphite was the same as in Example 8. The amount of the conductive carbon black was 15% by weight relative to the total amount of the PTFE, the carbon black, and the graphite and the amount of the graphite was 10% by weight relative to the total amount of the PTFE, the carbon black, and the graphite.

As in JP H08-253600 A, 1,1-dichloro-1-fluoroethane was used as a water-insoluble organic solvent.

Experiment 3

Each of the PTFE compositions obtained in Example 8 and Comparative Example 3 was subjected to headspace sampling GC/MS analysis for the organic solvent contained in the PTFE composition.

Specifically, 1 g of a sample was heated at 200° C. for 30 minutes in a headspace and subjected to measurement using Agilent 5977A (column DB-624).

The analysis demonstrates that the PTFE composition obtained in Example 8 contained no organic solvent (smaller than the detection limit). In contrast, 1,1-dichloro-1-fluoroethane (1.2 ppm by mass) was detected in the PTFE composition obtained in Comparative Example 3.

Experiment 4

The coverage of each of the PTFE compositions obtained in the respective examples and comparative examples was calculated.

The results are shown in Table 7.

TABLE 7

| | Image used | Coverage (%) |
|---|---|---|
| Example 1 | Video micrograph | 99 |
| Comparative Example 1 | Video micrograph | 99 |
| Comparative Example 2 | Video micrograph | 39 |
| Example 8 | Video micrograph | 82 |
| | Electron micrograph | 91 |
| Comparative Example 3 | Video micrograph | 41 |
| | Electron micrograph | 8 |

Figure 16:
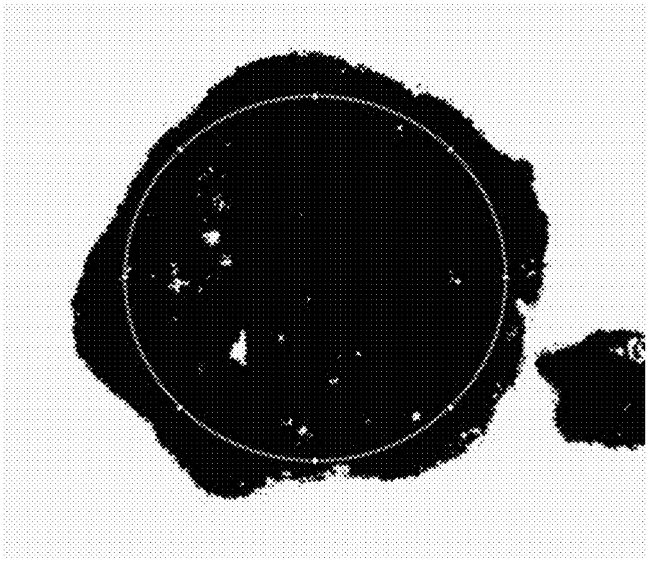
FIG. 16 is an image obtained by binarizing a video micrograph of a composition obtained in Example 1.
Figure 17:
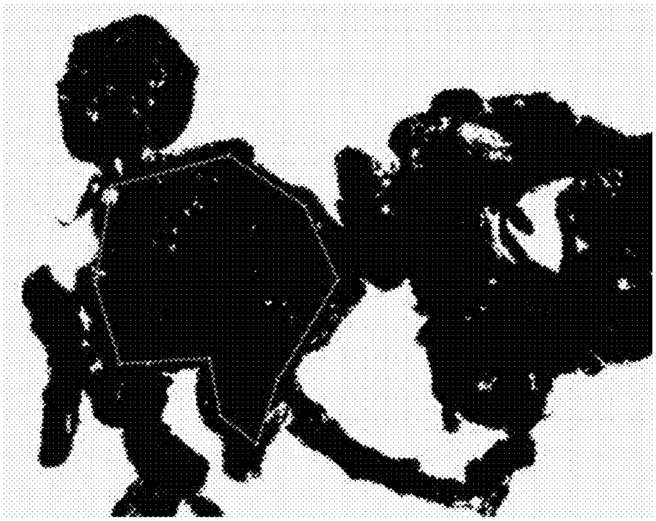
FIG. 17 is an image obtained by binarizing a video micrograph of a composition obtained in Comparative Example 1.
Figure 18:
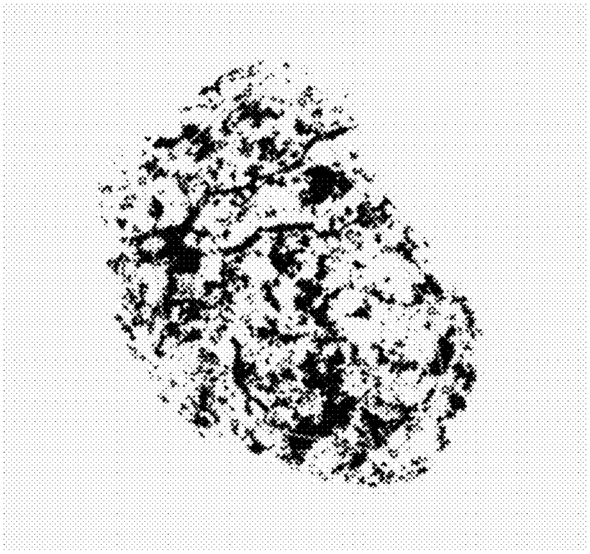
FIG. 18 is an image obtained by binarizing a video micrograph of a composition obtained in Comparative Example 2.

FIGS. 16, 17, and 18 show images obtained by binarizing the video micrographs of the compositions obtained in Example 1, Comparative Example 1, and Comparative Example 2, respectively.

Figure 19A:
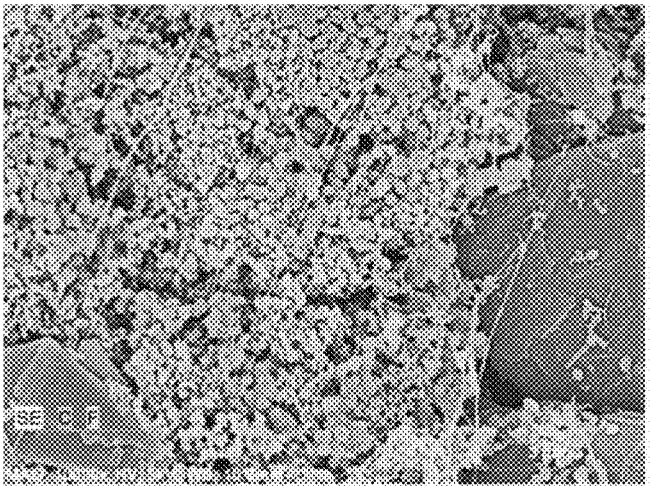
FIG. 19A is an electron micrograph of a composition obtained in Example 8.
Figure 19B:
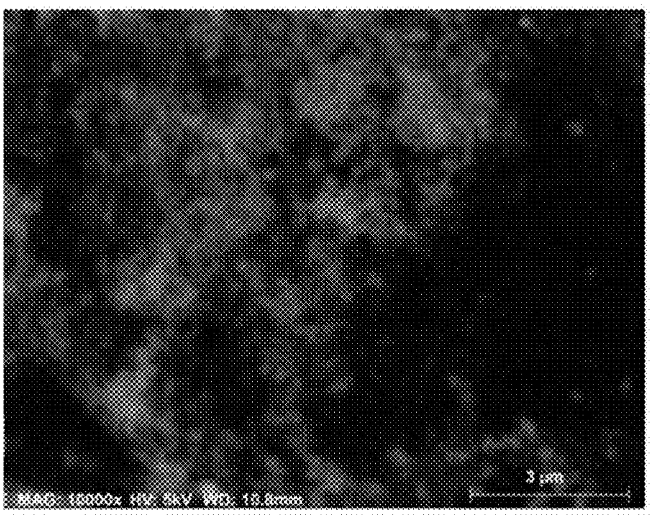
FIG. 19B is an elemental mapping image obtained by elemental mapping for fluorine on the electron micrograph.
Figure 19C:
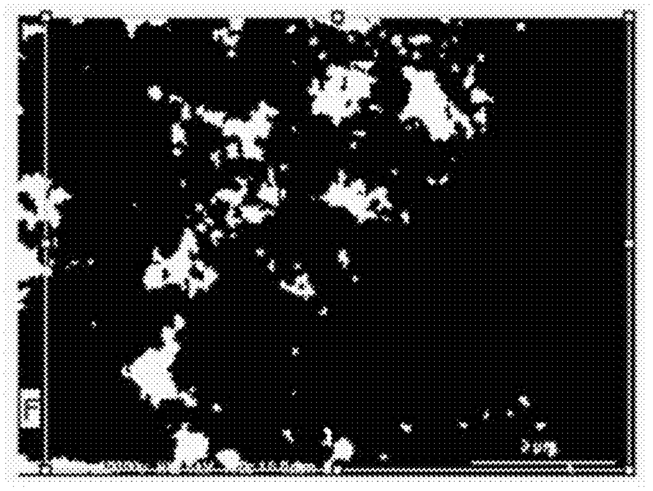
FIG. 19C is an image obtained by binarizing the elemental mapping image.

FIGS. 19A, 19B and 19C, respectively, show an electron micrograph of the composition obtained in Example 8, an elemental mapping image obtained by elemental mapping for fluorine on the electron micrograph, and an image obtained by binarizing the elemental mapping image.

Figure 20A:
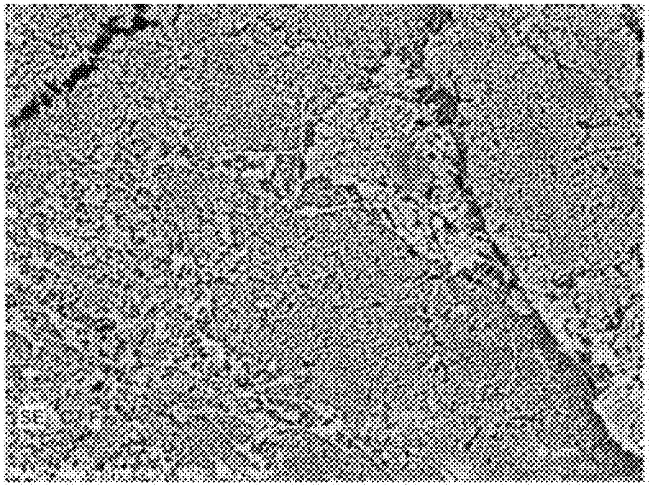
FIG. 20A is an electron micrograph of a composition obtained in Comparative Example 3.
Figure 20B:
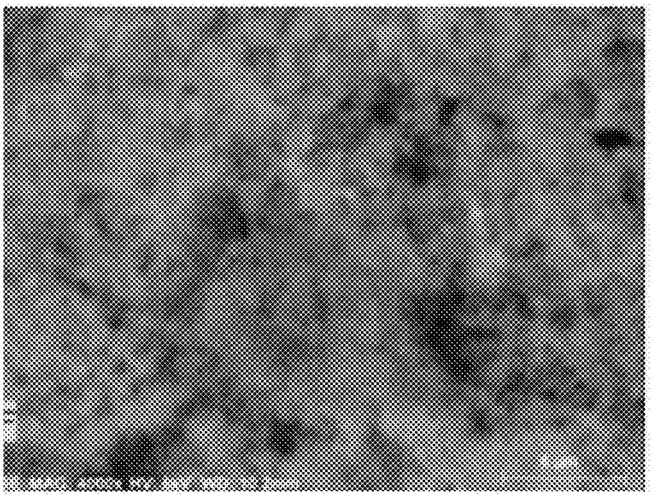
FIG. 20B is an elemental mapping image obtained by elemental mapping for fluorine on the electron micrograph.
Figure 20C:
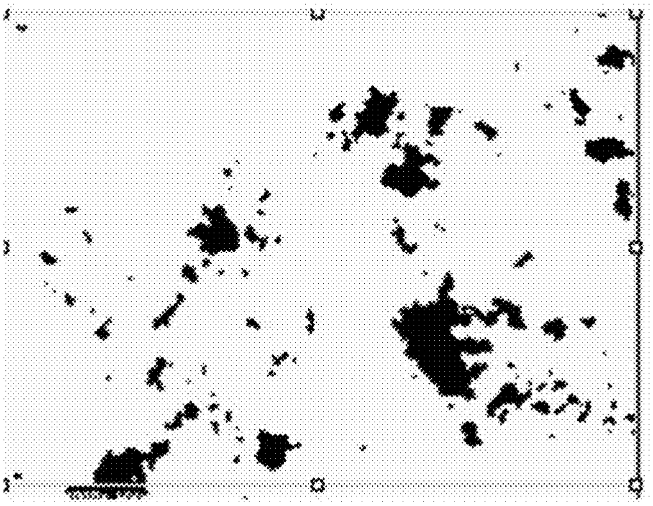
FIG. 20C is an image obtained by binarizing the elemental mapping image.

FIGS. 20A, 20B and 20C, respectively, show an electron micrograph of the composition obtained in Comparative Example 3, an elemental mapping image obtained by elemental mapping for fluorine on the electron micrograph, and an image obtained by binarizing the elemental mapping image.

What is claimed is:

1. A method for producing a polytetrafluoroethylene composition, comprising mixing a polytetrafluoroethylene resin and a filler using an airflow mixer which is a pulse-type airflow mixer configured to provide a polytetrafluoroethylene composition containing the filler uniformly covering surfaces of particles of the polytetrafluoroethylene resin, wherein in the mixing, a temperature of a mixing tank of the airflow mixer is controlled to be within a range of 5° C. or higher and 30° C. or lower, wherein the mixing includes feeding air to the mixing tank through a plurality of nozzles, the mixing tank comprising therein the polytetrafluoroethylene resin and the filler, and wherein the plurality of nozzles are vertically oriented relative to the mixing tank.

2. The production method according to claim 1, wherein in the polytetrafluoroethylene composition, the filler has a coverage of 50% or higher and 100% or lower on the surfaces of particles of the polytetrafluoroethylene resin.

3. The production method according to claim 1, wherein the airflow mixer is the pulse-type airflow mixer.

4. The production method according to claim 3, wherein in the mixing, the pulse-type airflow mixer is adjusted to have a pulse interval of 5 seconds or longer and 30 seconds or shorter.

5. The production method according to claim 3, wherein in the mixing, the pulse-type airflow mixer is set to have a single pulse airflow duration of 0.8 seconds or longer and 2 seconds or shorter.

6. The production method according to claim 3, wherein in the mixing, the pulse-type airflow mixer is set to have a pulse count of 5 or more and 40 or less.

7. The production method according to claim 1, wherein in the mixing, the airflow mixer is set to have an intake pressure of 0.4 MPa or higher and 0.8 MPa or lower.

8. The production method according to claim 1, wherein in the mixing, the temperature of the mixing tank of the airflow mixer is controlled to be within the range of 5° C. or higher and 19° C. or lower.

9. The production method according to claim 1, wherein in the mixing, the temperature of the mixing tank of the airflow mixer is controlled by circulation of a coolant or with a freezing air dryer.

10. The production method according to claim 1, wherein the filler comprises a functional filler or toner powder, and the functional filler comprises:

one or more organic fillers selected from aramid fiber, polyphenyl ester, polyphenylene sulfide, polyimide, polyether ether ketone, polyphenylene, polyamide, and wholly aromatic polyester resin; or one or more inorganic fillers selected from metal powder, graphite, carbon black, coke, carbon powder, carbon fiber, graphene, carbon nanotube, ceramic, talc, mica, aluminum oxide, zinc oxide, tin oxide, titanium oxide, silicon oxide, calcium carbonate, calcium oxide, magnesium oxide, potassium titanate, glass fiber, glass pieces, glass beads, silicon carbide, calcium fluoride, boron nitride, barium sulfate, molybdenum disulfide, and potassium carbonate whiskers.

11. The production method according to claim 1, wherein in the mixing, the filler is added in an amount of 0.1% by weight or more and 60% by weight or less relative to a total amount of the polytetrafluoroethylene resin and the filler.

12. The production method according to claim 1, wherein in the mixing, the filler has a particle size of 10 nm or greater and 100 μm or smaller.

13. The production method according to claim 1, wherein in the mixing, the polytetrafluoroethylene resin and the filler have a load factor of 0.2 or higher and 0.6 or lower.

14. The production method according to claim 1, wherein the polytetrafluoroethylene resin is a polytetrafluoroethylene dispersion resin.

15. The production method according to claim 1, wherein the particles of the polytetrafluoroethylene resin have an average particle size of 250 μm or greater and 800 μm or smaller.

16. The production method according to claim 1, wherein the filler has an average particle size of 10 nm or more and 100 μm or smaller.

17. The production method according to claim 15, wherein the filler has an average particle size of 10 nm or more and 100 μm or smaller.

18. The production method according to claim 1, wherein shearing of the polytetrafluoroethylene resin does not occur during the mixing.

* * * * *